(12) United States Patent
Onodera et al.

(10) Patent No.: US 6,696,183 B2
(45) Date of Patent: Feb. 24, 2004

(54) METALLIC THIN FILM MAGNETIC RECORDING MEDIUM

(75) Inventors: Seiichi Onodera, Miyagi (JP); Shinya Yoshida, Miyagi (JP); Kazunari Motohashi, Miyagi (JP); Takashi Kanou, Miyagi (JP); Tomoe Iwano, Miyagi (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/949,742

(22) Filed: Sep. 10, 2001

(65) Prior Publication Data

US 2002/0168550 A1 Nov. 14, 2002

(30) Foreign Application Priority Data

Sep. 26, 2000 (JP) .................................... P2000-276379
Sep. 26, 2000 (JP) .................................... P2000-292586
Sep. 26, 2000 (JP) .................................... P2000-292605

(51) Int. Cl.$^7$ ............................... G11B 5/66; G11B 5/70
(52) U.S. Cl. ............................... 428/694 TB; 428/216; 428/336; 428/694 TS; 428/694 TC; 428/900
(58) Field of Search .................... 428/694 TB, 694 BB, 428/216, 336, 694 TS, 694 TC, 900

(56) References Cited

U.S. PATENT DOCUMENTS 5,604,032 A * 2/1997 Kai et al. .................... 428/336
5,989,680 A * 11/1999 Wakana et al. ............. 428/141
6,346,310 B1 * 2/2002 Naoe et al. ................. 428/141
6,558,774 B1 * 5/2003 Saliba et al. ................ 428/156

* cited by examiner

Primary Examiner—Holly Rickman
(74) Attorney, Agent, or Firm—Sonnenschein, Nath & Rosenthal LLP

(57) ABSTRACT

In the metallic thin film magnetic recording medium having the magnetic layer formed on a main face of a nonmagnetic supporting body according to vacuum thin film formation technology, the thickness of the nonmagnetic supporting body is 5 μm or less, the thickness of the magnetic layer is 20 nm–100 nm and a lining layer 20 nm–200 am in thickness is formed of metal, non-metal or alloy of these materials or oxide compound thereof according to vacuum thin film formation technology. Light transmittance is 5% or less and permeating water vapor amount is 5 g/m$^2$·day or less. The lining layer and the back layer are formed successively on a main face opposite to the magnetic layer formation face. The relative roughness factor (Ra) of the topmost surface of the lining layer formation face is 2–15 nm.

11 Claims, 5 Drawing Sheets

100

100

METALLIC THIN FILM MAGNETIC RECORDING MEDIUM

RELATED APPLICATION DATA

The present application claims priority to Japanese Application(s) No(s). P2000-276739 filed Sep. 12, 2000, P2000-292586 filed Sep. 26, 2000 and P2000-292605 filed Sep. 26, 2000, which application(s) is/are incorporated herein by reference to the extent permitted by law.

BACKGROUND OF THE INVENTION

1. Field of the Invention

The present invention relates to a metallic thin film magnetic recording medium.

2. Description of the Related Art

In recent years, high-density recording has been demanded further strongly in fields of video tape recorder and the like in order to achieve high definition screen. As a magnetic recording medium corresponding to this demand, a so-called metallic thin film magnetic recording medium, in which a magnetic layer is formed by coating a nonmagnetic supporting body directly with ferromagnetic material composed of a metal or an alloy such as Co—Ni according to vacuum thin film formation technology, has been proposed. As such a magnetic recording medium, for example, a vapor-deposition tape and the like for a high-band 8-mm video tape recorder (hereinafter referred to as simply VTR) and a digital VTR have been currently produced.

The aforementioned vacuum thin film formation technology includes vacuum deposition method, sputtering method, ion plating method, vapor growth method and the like, and as the ferromagnetic metallic material, Co—Cr, Co and the like as well as the aforementioned Co—Ni have been used.

Such a magnetic recording medium of metallic magnetic thin film type is different from so-called coating type magnetic recording medium obtained by coating a nonmagnetic supporting body with coating medium produced by mixing magnetic powder with binder and the binder, which is a nonmagnetic material, is not mixed in the magnetic layer. Therefore, the charging density of the ferromagnetic metallic particle is high. Thus, the magnetic layer can be formed extremely thin, so that demagnetization by recording or loss of thickness upon reproduction is extremely small thereby indicating an excellent electromagnetic conversion in short wavelength. Further, there is such an advantage that magnetic characteristics such as coercive force, residual magnetism and rectangularity ratio can be controlled and produced stably.

Meeting a demand for further intensification of recording density in the magnetic recording medium, instead of a conventional induction type head, a magnetic resistance effect type magnetic head (MR head) has been utilized as the magnetic head for use in reproduction of recording information.

Because the MR head has a characteristic making it possible to detect minute leaking magnetic flux from the magnetic recording medium in a high sensitivity, intensifying the thinning of the magnetic layer has enabled reduction of noise, so that improvement of plane recording density can be achieved.

In the tape-like magnetic recording medium, it has been an important subject to thin the nonmagnetic supporting body containing the magnetic layer further so as to incorporate a longer magnetic tape in a cassette in order to improve the recording density per unit volume.

In the above-described metallic thin film magnetic recording medium, usually, protective layer is formed on the magnetic layer or a lining layer is formed on a main face opposite to the magnetic layer formation face in order to improve the tape durability, traveling performance and the like.

Further, in the metallic thin film magnetic recording medium, the surface has been smoothed further in order to reduce spacing loss corresponding to the trend of increased recording density.

However, if the surface of the magnetic layer is smoothed, tape's contact area with a magnetic head is increased, so that friction is increased thereby leading to increase of shearing stress generated in the magnetic layer. To protect the magnetic layer from such a strict sliding condition, it is necessary to form the protective layer on the magnetic layer.

Further, the lining layer has the function of reducing electrical resistance of the surface of the nonmagnetic supporting body, preventing traveling failure due to electric charge, improving the durability of the nonmagnetic supporting body, protecting from the generation of flaws which may be caused by friction with the head during traveling and protecting from friction between the magnetic tapes.

However, if the nonmagnetic supporting body is thinned to raise recording density per unit volume as described above, mechanical strength such as breaking resistance, breaking extension, and a product between Young's modulus of elasticity and nonmagnetic supporting body drops. Consequently, durability when an external force is applied to the magnetic tape deteriorates, and tape traveling performance and head contact performance worsen.

Further, if the thinning of the magnetic layer, which composes the magnetic recording medium, is accelerated so that the film thickness is decreased from the conventional 200 nm to 100 nm or less, the tape receives an influence such as oxidization from external environment to which the magnetic layer is exposed. As a result, its magnetic characteristic may be affected badly, so that its storage durability deteriorates relatively.

To improve mechanical strength of the nonmagnetic supporting body, instead of polyethylene terephthalate (PET), polyethylene naphthalate (PEN) conventionally used as a nonmagnetic supporting body of the magnetic tape, a high strength material such as polyamide film has been employed.

By using the polyamide film, the thickness of the nonmagnetic supporting body can be reduced to 3–5 $\mu$m.

However, the polyamide film is made of material more expensive than the conventionally marketed polyethylene terephthalate (PET) or polyethylene naphthalate (PEN) and not suitable for production and sale in large quantity as the nonmagnetic supporting body of the magnetic tape.

If the magnetic layer is formed on such a thinned nonmagnetic supporting body according to the vacuum thin film formation technology, cupping is generated in the width direction by its stress, so that traveling performance and head touch worsen.

In view of the above-described problems, the present invention intends to provide a metallic thin film magnetic recording medium of metallic magnetic thin film type adapted for the MR head, in which the magnetic layer and the nonmagnetic supporting body are thinned further, recording density per unit volume is improved, and at the same time, production cost is reduced, an influence from external environment, specifically, water vapor permeability is reduced and further cupping is reduced.

On the other hand, in a method of employing a nonmagnetic supporting body in which Young's modulus of elasticity is raised in the width direction of the magnetic tape in order to accelerate thinning of the magnetic tape, the magnetic tape is produced by high-rate extension and therefore, there is a limit in rise of Young's modulus of elasticity. Further, if the nonmagnetic supporting body is extended to raise Young's modulus of elasticity, balance in the length direction and width direction of the magnetic tape is lost, so that the configuration of the nonmagnetic supporting body worsens, thereby leading to worsening of the configuration of the magnetic tape.

According to other method for intensifying the thinning of the magnetic tape, coating medium containing plate-like filler and resin is applied onto the nonmagnetic supporting body so as to form a highly stiff layer having predetermined minute particles and then, the magnetic layer is formed on this highly stiff layer so as to improve the stiffness.

However, in this case, coupling between filler and resin acting as a vehicle is not sufficient and therefore, there is a limit in the effect of raising Young'modulus of elasticity. Further, because the highly stiff layer needs a predetermined thickness, it induces a rise in the thickness of the magnetic tape, thereby providing a problem in accelerating the thinning of the magnetic tape.

On the other hand, to improve mechanical strength of the nonmagnetic supporting body, instead of polyethylene terephthalate (PET), polyethylene naphthalate (PEN) conventionally used as a nonmagnetic supporting body of the magnetic tape, a high strength material such as polyamide film has been employed.

By using the polyamide film, the thickness of the nonmagnetic supporting body can be reduced to 3–5 $\mu$m.

However, the polyamide film is made of material more expensive than the conventionally marketed polyethylene terephthalate (PET) or polyethylene naphthalate (PEN) in terms of the unit weight price and not suitable for production and sale in large quantity as the nonmagnetic supporting body of the magnetic tape.

Accordingly, in view of the above-described problems, an object of the present invention is to provide a metallic thin film magnetic recording medium of metallic magnetic thin film type favorable for actual use, in which the magnetic layer and the nonmagnetic supporting body are thinned further, recording density per unit volume is improved, and sufficient mechanical strength thereof is achieved at low cost, head contact performance is optimized by controlling the relative roughness factor (Ra) of the topmost surface and the frictional coefficient and the configuration of the magnetic tape is improved by controlling the thickness of each layer.

SUMMARY OF THE INVENTION

There is provided a metallic thin film magnetic medium having a magnetic layer formed on a main face of a nonmagnetic supporting body according to vacuum thin film formation technology, wherein the thickness of the nonmagnetic supporting body is 5 $\mu$m or less and the thickness of the magnetic layer is 20 nm–100 nm, the metallic thin film magnetic recording medium further comprising a lining layer having the thickness of 20 nm–200 nm formed on a main face opposite to the magnetic layer formation face, of metal, non-metal or alloy or oxide compound thereof according to the vacuum thin film formation technology.

According to the metallic thin film magnetic recording medium of the present invention, it is favorable for a high sensitivity MR head and thinning of the magnetic layer and the nonmagnetic supporting body is achieved, so that the recording density per unit volume is improved.

Because of provision of the lining layer on a main face opposite to the magnetic layer, a thin nonmagnetic supporting body of cheap material can be applied, so that production cost of the metallic thin film magnetic recording medium is reduced while intensifying the mechanical strength.

In the metallic thin film magnetic recording medium having the magnetic layer formed on a main face of the nonmagnetic supporting body according to vacuum thin film formation technology, the thickness of the magnetic layer is 100 nm or less and the lining layer and the back layer are formed successively on a main face opposite to the magnetic layer formation face.

The lining layer is formed in the thickness of 20–500 nm of metal, non-metal or alloy of these materials or oxide compound thereof according to vacuum thin film formation technology and the total of the nonmagnetic supporting body and the lining layer is 2–5 $\mu$m.

The back layer is formed in the thickness of 10–200 nm according to vacuum thin film formation technology and the relative roughness factor (Ra) of the topmost surface of the back layer formation face is 2–15 nm.

According to the metallic thin film magnetic recording medium of the present invention, it is favorable for a high sensitivity MR head and thinning of the magnetic layer and the nonmagnetic supporting body is achieved, so that the recording density per unit volume is improved.

Further, because the lining layer is formed on a main face opposite to the magnetic layer, even if the nonmagnetic supporting body which composes the magnetic recording medium is constructed in a thin shape using the conventional cheap material, sufficient mechanical strength can be maintained without using any nonmagnetic supporting body of expensive material, thereby achieving reduction of the production cost of the metallic thin film magnetic recording medium.

The lining layer is capable of providing the nonmagnetic supporting body with sufficient stiffness, and improving traveling stability and contact performance with the magnetic head, so that the configuration of the magnetic tape is improved.

Further, by specifying the thickness of the lining layer and the back layer numerically, the relative roughness factor (Ra) of the topmost surface is controlled, so that the configuration of the magnetic tape is made favorable.

Further, by forming the lining layer on a main face opposite to the magnetic layer, a bad influence from external environment is avoided thereby improving corrosion resistance and storage characteristic.

Further, because the lining layer is formed, the back layer can be applied on the lining layer according to vacuum vapor deposition method such as CVD method and sputtering method or coating method and further, the relative roughness factor of the surface can be controlled. By specifying the roughness factor (Ra) to 2–15 nm, the frictional coefficient of the surface is controlled so as to improve the traveling stability.

The lining layer is formed in the thickness of 10–100 nm on a main face opposite to the magnetic layer formation face of metal, non-metal or alloy of these materials or oxide compound thereof according to vacuum thin film formation technology. Light transmittance is 5% or less and permeating water vapor amount is less than 5 g/m$^2$·day.

According to the metallic thin film magnetic recording medium of the present invention, it is favorable for a high sensitivity MR head and thinning of the magnetic layer and the nonmagnetic supporting body is achieved, so that the recording density per unit volume is improved.

Because the lining layer is formed on a main face opposite to the magnetic layer, the thin nonmagnetic supporting body can be applied using cheap material, so that production cost of the metallic thin film magnetic recording medium can be reduced while improving the mechanical strength.

Further, because the lining layer is formed on a main face opposite to the magnetic layer, the magnetic layer is protected from a bad influence form external environment, so that corrosion of the magnetic layer is avoided effectively and corrosion resistance is improved, thereby the magnetization deterioration rate being reduced.

DETAILED DESCRIPTION OF THE PREFERRED EMBODIMENTS

The metallic thin film magnetic recording medium of the present invention has a magnetic layer formed on a main face of a nonmagnetic supporting body according to vacuum thin film formation technology. The thickness of the nonmagnetic supporting body is 5 µm or less and the thickness of the magnetic layer is 20 nm–100 nm. A lining layer is formed of metal, non-metal or alloy or oxide compound thereof on a main face opposite to the side of the magnetic layer formation layer in the thickness of 20–200 nm according to vacuum thin film formation technology.

Hereinafter, the metallic thin film magnetic recording medium of the present invention and an example of a manufacturing apparatus for the metallic thin film magnetic recording medium will be described. The present invention is not restricted to examples shown below.

Figure 1:
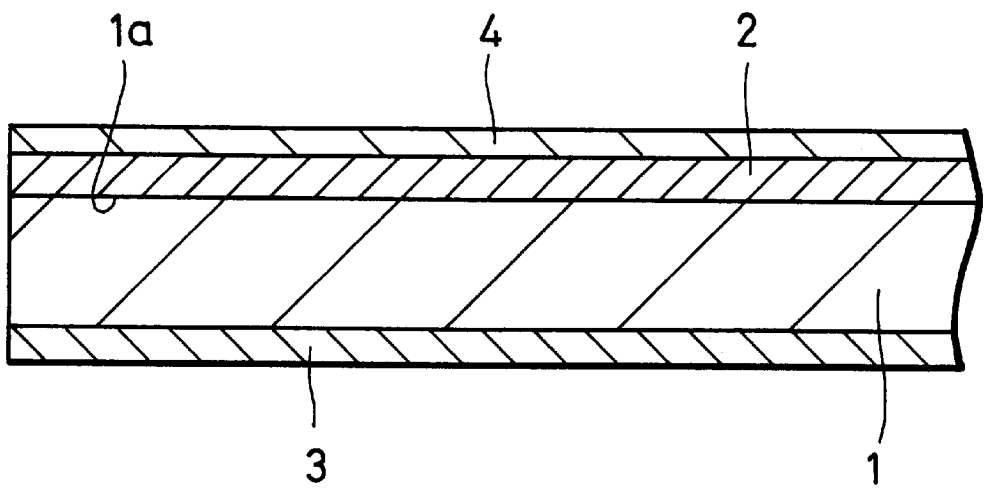
FIG. 1 is a schematic sectional view 1 of a metallic thin film magnetic recording medium of the present invention.

FIG. 1 shows a schematic sectional view of the metallic thin film magnetic recording medium of the present invention.

This metallic thin film magnetic recording medium 100 has a magnetic layer 2 having the thickness of 20 nm–100 nm, formed on a main face of a thin nonmagnetic supporting body 1 having the thickness of 5 µm or less according to vacuum thin film formation technology and a lining layer 3 having the thickness of 20–200 nm formed on a main face opposite to the side of the magnetic layer 2 formation face 1a of metal, non-metal or an alloy thereof or oxide compound, according to the vacuum thin film formation technology.

Any known material used usually as the substrate of a magnetic tape can be applied to the nonmagnetic supporting body 1 composing the metallic thin film magnetic recording medium 100 of the present invention.

For example, polyester group such as polyethylene terephthalate, polyethylene 2,6-naphthalene, polyolefin group such as polyethylene, polypropylene, cellulose derivatives such as cellulose triacetate, plastics such as polycarbonate, polyimide, polyamide-imide and the like can be picked up.

Although the nonmagnetic supporting body 1 is usually 3–10 nm in thickness on a conventional magnetic tape so as to maintain a sufficient mechanical strength, if a mechanical strength for the time of driving of the magnetic recording medium can be obtained according to other method, this can be made thinner. In the metallic thin film magnetic recording medium 100 of the present invention, the nonmagnetic supporting body 1 is 5 µm or less, for example, 1–5 µm.

It is permissible to form a coating layer (not shown) on the magnetic layer formation surface of the nonmagnetic supporting body 1 with coating agent containing binder resin, filler and surface active agent and provide the surface with fine unevenness or intensify its mechanical strength.

As the binder resin, for example, aquatic polyester resin, aquatic acrylic resin, aquatic polyurethane resin and the like can be mentioned.

As the kinds of the filler, grains composed of heat resistant polymer, silicon dioxide, calcium carbonate and the like can be mentioned.

By setting the average grain diameter of the surface of the coating layer formed on the side of the magnetic layer formation surface on the nonmagnetic supporting body 1 to 10–50 nm and the density of protrusions on the surface by the filler to be 2,000,000–5,000,000/mm$^2$, the traveling durability of the metallic thin film magnetic recording medium 100 can be made favorable.

By enlarging the average grain diameter of the coating layer so as to increase the surface protrusion density, the roughness of the surface is increased and the electromagnetic conversion characteristic by spacing is deteriorated.

As the ferromagnetic metallic material for the magnetic layer 2 composing the metallic thin film magnetic recording medium 100, any conventionally known metal, metal oxide, alloy and the like can be employed.

For example, such materials as Co, CoNi, CoFe, CoNiFe, CoCr, CoPt, CoPtB, CoCrPt, CoCrTa, CoCrPtTa, substance obtained by evaporating these materials in oxygen atmosphere and oxides obtained by sputtering can be mentioned.

Further, these materials may contain one or two or more kinds of metals or existing ferromagnetic metallic alloy such as Co—Al$_2$O$_3$, CoPt—SiO$_2$ so that a non-solution base magnetic layer is formed.

Figure 3:
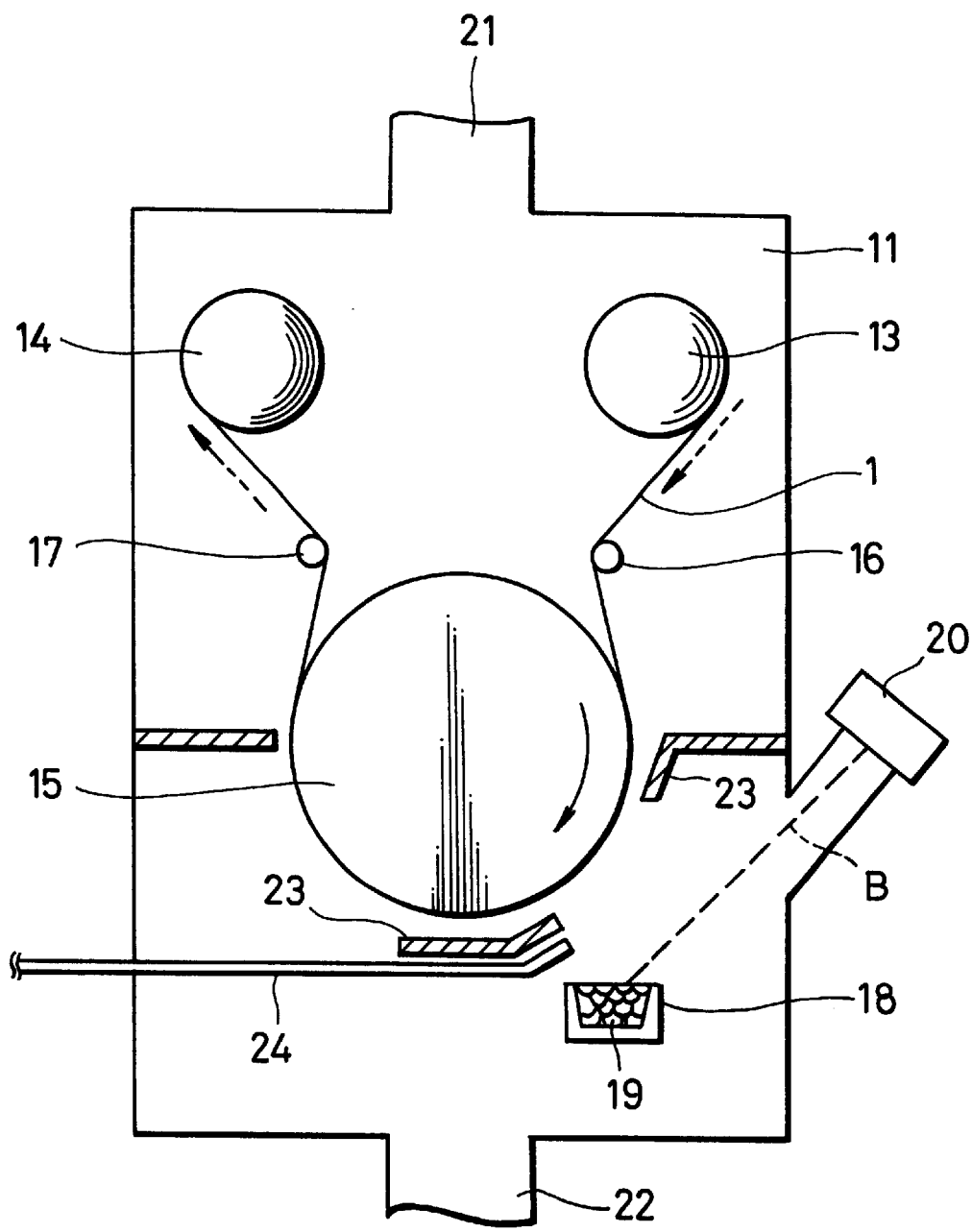
FIG. 3 is a schematic sectional view of a vapor deposition apparatus for producing a magnetic layer and a lining layer composing the metallic thin film magnetic recording medium of the present invention.

FIG. 3 shows a schematic diagram of an evaporating apparatus 10 for forming the magnetic layer 2 of the metallic thin film magnetic recording medium 100.

This evaporating apparatus 10 includes a vacuum chamber 11 which is evacuated by exhausting air through exhaust holes 21, 22, the vacuum chamber having a feed roll 13 and a winding roll 14 so that the nonmagnetic supporting body 1 is fed successively between these rolls.

A cooling can 15 is provided on a traveling way of the nonmagnetic supporting body 1 between the feed roll 13 and the winding roll 14. This cooling can 15 is provided with a cooling unit (not shown), which prevents a thermal deformation and the like due to a rise in temperature of the nonmagnetic supporting body 1.

The nonmagnetic supporting body 1 is fed out successively from the feed roll 13, passes the peripheral face of the cooling can 15 and wound up by the winding roll 14.

Meanwhile, a predetermined tension is applied to the nonmagnetic supporting body 1 by the guide rolls 16, 17 so as to ensure a smooth traveling.

A crucible 18 is provided below the cooling can 15 within the vacuum chamber 11 and the crucible is filled with metallic magnetic material 19. On the other, an electron gun 20 is provided to evaporate metallic magnetic material 19 charged in the crucible 18 by heating in a side wall of the vacuum chamber 11. This electron gun 20 is disposed at a position allowing electron beam B discharged therefrom to be irradiated on the metallic magnetic material 19. Then, the metallic magnetic material 19 evaporated by irradiating with this electron beam B is applied on the surface of the nonmagnetic supporting body 1 so that the magnetic layer 2 is formed.

Further, a shutter 23 is disposed near the cooling can 15 between the cooling can 15 and the crucible 18 such that it covers a predetermined region of the nonmagnetic supporting body 1 traveling on a peripheral face of the cooling can 15. Consequently, evaporated metallic magnetic material 19 is deposited obliquely at a predetermined incident angle to the nonmagnetic supporting body 1 by this shutter 23.

Upon vapor deposition of the magnetic layer, oxygen gas is supplied to the surface of the nonmagnetic supporting body 1 by means of an oxygen gas introduction pipe 24 provided which passes through a side wall portion of the vacuum chamber 11 in order to improve the magnetic characteristic, durability and weather resistance of the magnetic layer.

Meanwhile, in addition to the above-described coating layer, a non-magnetic foundation layer (not shown) may be formed between the nonmagnetic supporting body 1 and the magnetic layer 2 in order to improve adhesion force between the nonmagnetic supporting body 1 and the magnetic layer 2, magnetic orientation of the magnetic layer 2 and corrosion resistance.

As material composing the foundation layer, not only Cr can be mentioned, but also metals such as Co, Zr, Pt, Au, Ta, W, Si, Cu, Ag, Al, Mn, Cr, Ti, V, Nb, Mo and an alloy of combination of two or more of these metals and compound thereof with oxygen, nitrogen or the like may be employed.

For example, if Cr layer is formed as the foundation layer by sputtering method and the magnetic layer is formed on that layer in the form of CoPtCr layer, it acts to direct the magnetization easy axis (c axis of hexagonal Co) of the magnetic layer inward of the face.

That is, with the Cr foundation layer, the metallic thin film magnetic recording medium comprised of Co alloy and Cr alloy is composed.

Usually, a protective layer 4 (see FIGS. 1 and 2) is formed on the magnetic layer 2 to secure excellent corrosion resistance and traveling resistance.

As the material for forming the protective layer 4, any conventionally known material can be employed. For example, $CrO_2$, $Al_2O_3$, BN, Co oxide, MgO, $SiO_2$, $Si_3O_4$, $SiN_x$, SiC, $SiN_x$—$SiO_2$, $ZrO_2$, $TiO_2$, TiC, MoS and the like can be mentioned.

Particularly, the protective layer 4 utilizing carbon as its base material has excellent durability, corrosion resistance and productivity.

The protective layer 4 can be formed according to the well known vacuum film formation technology and is formed in the thickness of 4–15 nm according to vacuum vapor deposition method, ion plating method, sputtering method or CVD method.

The CVD method, in which carbon compound is dissolved in plasma to form a film on the magnetic layer 2, is excellent in abrasion resistance, corrosion resistance and surface coating ratio and according to this method, hard carbon called diamond-like carbon, having a smooth surface shape and a high electric resistivity, can be coated in a ultra-thin layer of, for example, about 10 nm or less in a stable condition.

As the carbon compound, any conventionally well known material such as carbon hydride series, ketone series, alcohol series can be used. Further, upon refining with plasma, it is permissible to introduce Ar, $H_2$ or the like as gas for enhancing dissolution of carbon compound.

To improve the film hardness and corrosion resistance of the diamond-like carbon, the carbon may be in a condition reacting with nitrogen or fluorine and the diamond-like carbon film may be of single layer or of multiple layers. Further, upon generation of plasma, $N_2$, $CHF_3$, $CH_2$, $F_2$ and other gas may be used independently or mixed appropriately to form the film of carbon compound.

If the protective layer 4 is formed too thick, loss by spacing is increased while if it is formed too thin, its abrasion resistance and corrosion resistance are deteriorated. Thus, it is desired to be formed in the thickness of 4–15 nm.

On the metallic thin film magnetic recording medium 100 of the present invention, the lining layer 3 is formed of metal, half-metal or compound such as alloy of these materials or oxide on the main face opposite to the magnetic layer 2 formation face.

The lining layer 3 is formed according to vacuum thin film formation technology.

As material for use in forming the lining layer 3, particularly, Al, $Al_2O_3$ can be mentioned. Additionally, such a metal as Mg, Si, Ti, V, Cr, Mn, Fe, Co, Ni, Cu, Zn, Ge, Zr, Nb, Mo, W alloy or oxide of these materials and the like can be employed.

The lining layer 3 can be formed according to the well-known vacuum film formation technology. For example, vacuum vapor deposition method, ion plating method, sputtering method or CVD method can be used to form the film.

That is, the lining layer 3 is formed by charging the evaporating apparatus 10 shown in FIG. 3 with material for formation of the lining layer 3 as a target material and then irradiating this with electron beam so as to execute evaporation by heat.

Next, a plasma CVD continuous film formation apparatus 300 capable of forming the protective layer 4 or the lining layer 3 of the metallic thin film magnetic recording medium 100 will be described.

Figure 4:
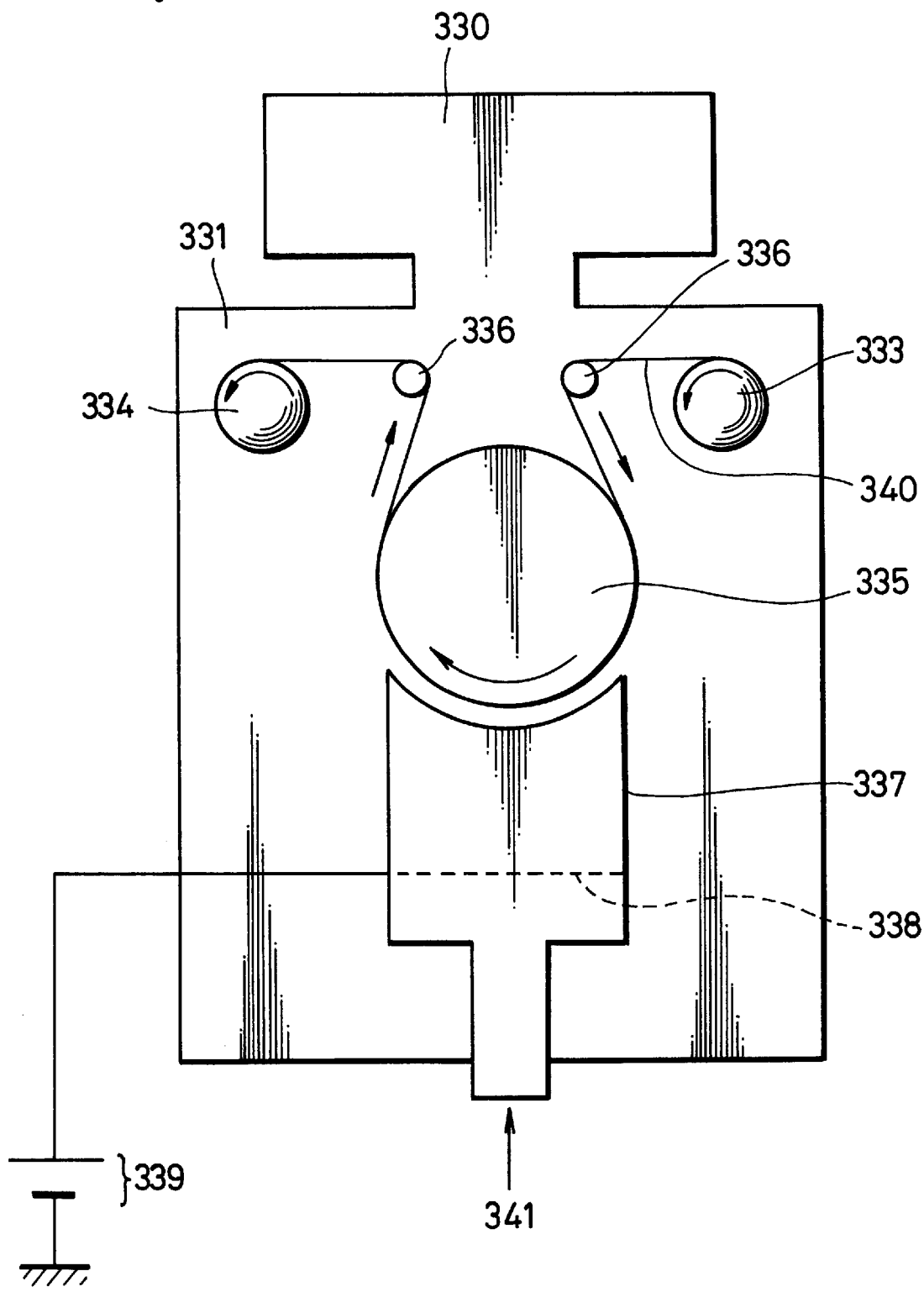
FIG. 4 is a schematic sectional view of a plasma CVD continuous film formation apparatus for producing a magnetic layer and a lining layer composing the metallic thin film magnetic recording medium of the present invention.
Figure 5:
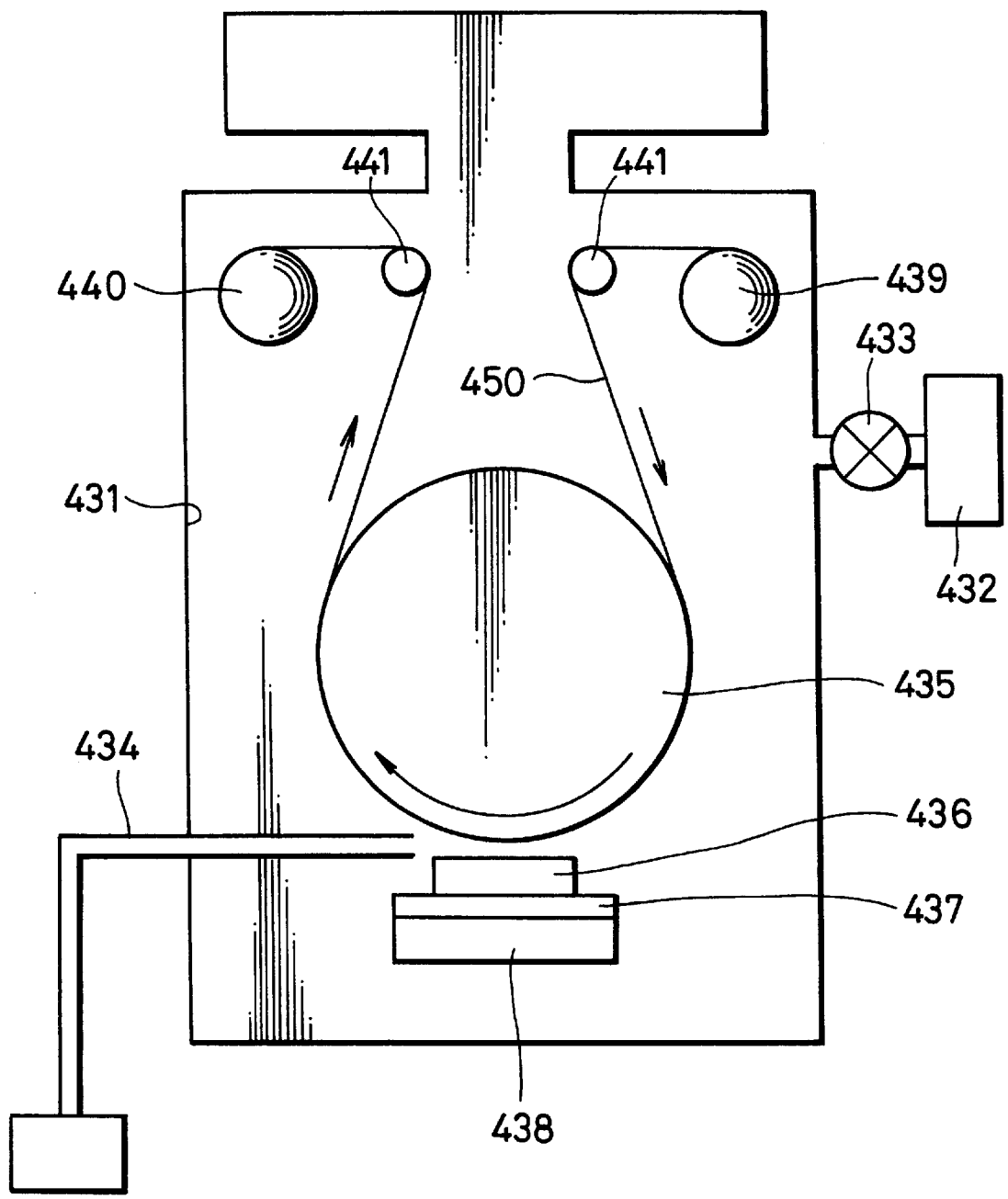
FIG. 5 is a schematic sectional view of a magnetron sputtering apparatus for producing a lining layer, a back layer and a protective layer composing the metallic thin film magnetic recording medium of the present invention.

In the apparatus 300 shown in FIG. 4, a feed roll 333 and a winding roll 334 are provided in a vacuum chamber 331 which is evacuated by exhausting air through an exhaust system 330. A processed body 340 in which a magnetic layer is formed on a nonmagnetic supporting body is fed successively from the feed roll 333 to the winding roll 334.

A cylindrical rotatable opposing electrode 335 is provided halfway of a traveling path of the processed body 340 between the feed roll 333 and the winding roll 334.

The processed body 340 is fed out successively from the feed roll 333, passes the peripheral face of the opposing electrode 335 and is wound up by the winding roll 334. Meanwhile, guide rolls 336 are disposed between the feed roll 333 and the opposing electrode 335 and between the opposing electrode 335 and the winding roll 334 so as to apply a predetermined tension to the processed body 340, so that the processed body 340 travels smoothly.

Further, a reaction tube 337 is provided within the vacuum chamber 331 and the electrode 338 is incorporated in this reaction tube 337. A predetermined potential is applied to this electrode 338 from a DC power supply 339.

Material gas is introduced through the reaction tube 337 from a discharge gas introduction port 341. The processed body 340 is fed out by the feed roll 333 and passes the peripheral face of the opposing electrode 335 so that it is fed into the reaction tube 337. Within this reaction tube 337, the protective layer 4 or the lining layer 3 is formed on the surface in a desired thickness.

If the lining layer 3 is formed too thin, a sufficient mechanical strength cannot be obtained, so that a problem occurs in terms of the durability and the function for protecting the metallic magnetic layer from external environment cannot be exerted. On the other hand, if it is formed too thick, an internal stress of the film is excessively large, so that curl in the length direction of the tape-like metallic thin film magnetic recording medium 100 or cupping in the width direction is generated.

Particularly, to maintain a magnetic head contact and traveling stability of the magnetic tape in a favorable condition for actual use, it is necessary to avoid generation of the cupping in the magnetic tape.

Figure 6:
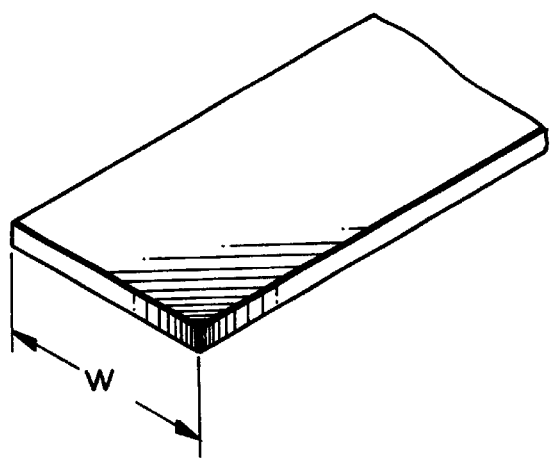
FIG. 6 is a schematic perspective view of a magnetic tape having an elongated shape.
Figure 7:
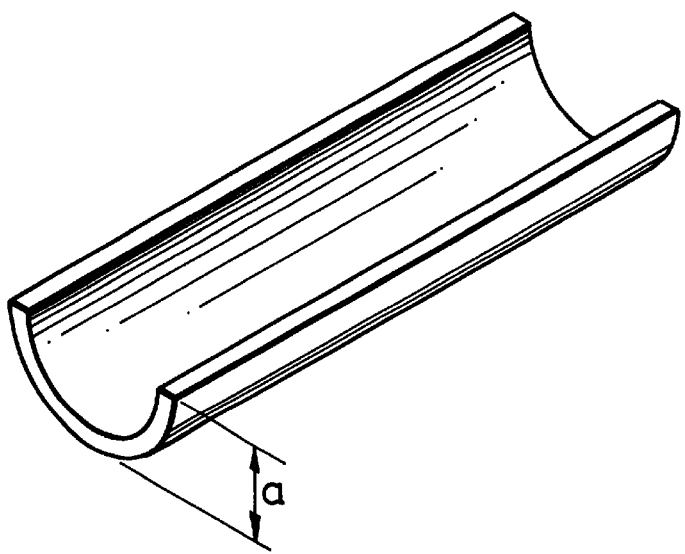
FIG. 7 is a diagram showing the state of cupping of an elongated shape magnetic tape.

FIG. 6 shows a schematic perspective view of the magnetic tape of an elongated shape and FIG. 7 shows a schematic diagram of the state in which the cupping is generated.

When the width of the magnetic tape is "w" as shown in FIG. 6 and the warp in the width direction or the cupping is "a" as shown in FIG. 7, it is necessary to control the thickness of the lining layer 3 upon formation of the film so that a ratio between these values, that is, an absolute value of a/w is reduced.

In the metallic thin film magnetic recording medium 100 of the present invention, the thickness of the lining layer 3 is controlled so that $a/w \leqq 10.0$, preferably, $a/w \leqq 5.0$ is attained.

In case where the magnetic layer 2 is formed in the thickness of 20 nm–100 nm, if the lining layer 3 is formed in the thickness of 20–200 nm, the internal stress of the magnetic tape is balanced so as to reduce the cupping.

Meanwhile, coating layer (not shown) containing binder resin and filler is formed between the nonmagnetic supporting body 1 and the lining layer 3 and a fine unevenness can be provided on the surface of the lining layer 3.

As the binder resin, for example, aquatic polyester resin, aquatic acrylic resin, aquatic polyurethane resin and the like can be mentioned.

As the kind of the filler, grain composed of heat resistant polymer, silicon dioxide, calcium carbonate and the like can be mentioned.

The surface of the lining layer 3 is desired to be formed in a rougher face than the surface of the magnetic layer 2 to secure an excellent traveling performance. The average grain diameter of the surface is 15–300 nm and it is desirable that protrusions of two or more sizes are contained in frequency of 10,000–5,000/mm$^2$ in terms of density.

Like the magnetic layer 2, the lining layer 3 can have a protective layer (not shown) on its surface to secure an excellent traveling durability.

As the material for forming the protective layer 4, any conventionally known material can be employed. For example, $CrO_2$, $Al_2O_3$, BN, Co oxide, MgO, $SiO_2$, $Si_3O_4$, $SiN_X$, SiC, $SiN_X$—$SiO_2$, $ZrO_2$, $TiO_2$, TiC, MoS and the like can be mentioned.

The protective layer 4 can be formed according to the well known vacuum film formation technology and is formed according to the aforementioned CVD method, vacuum vapor deposition method, ion plating method, sputtering method or the like.

In the metallic thin film magnetic recording medium 100 of the present invention, the side of the magnetic layer 2 formation face and the topmost layer of the lining layer 3 formation face are desired to be coated with lubricant or anti-corrosive agent.

Next, the metallic thin film magnetic recording medium 100 of the present invention will be described about concrete examples and comparative examples. The metallic thin film magnetic recording medium of the present invention is not restricted to the examples described below.

In a current magnetic recording tape system, a final position of the magnetic tape is detected using light transmittance of the magnetic tape. That is, the magnetic tape is produced such that the light transmittance at the final position of a signal recording effective region is high and according to this phenomenon, the magnetic recording tape system detects the final position. For the reason, in the metallic thin film magnetic recording medium 100 of the present invention, the light transmittance of the signal recording effective region after the lining layer 3 is formed is required to be 5% or less.

In the metallic thin film magnetic recording medium 100 of the present invention having the above described structure, the light transmittance in the signal effective region shall be 5% or less. Consequently, this prevents the end sensor function of the magnetic tape reproduction system from being activated erroneously during traveling of the tape.

Further, in the metallic thin film magnetic recording medium of the present invention, the amount of permeating water vapor shall be less than 5 g/m$^2$-day. Consequently, corrosion of the magnetic layer is suppressed and magnetization deterioration ratio is less than 7%, so that corrosion resistance thereof can be improved.

EXAMPLE 1

As the nonmagnetic supporting body 1 of the metallic thin film magnetic recording medium 100 shown in FIG. 1, a polyethylene terephthalate film 4.5 μm thick was prepared.

Next, the magnetic layer 2 was formed using the evaporating apparatus 10 shown in FIG. 3. Assuming the metallic magnetic material 19 to be Co, a predetermined amount of oxygen was introduced from the oxygen gas introduction pipe 24, and electron beam B was irradiated with the electron gun 20 so as to heat the metallic magnetic material 19. As a result, Co—CoO base magnetic layer was formed in the thickness of 80 nm according to reactive vacuum vapor deposition.

The protective layer 4 was formed on the magnetic layer 2. The protective layer 4 was formed in the thickness of 8 nm according to the CVD method. After that, by coating the carbon protective film with perfluoropolyester, lubricant layer was formed.

Next, the lining layer 3 was formed on a main face opposite to the magnetic layer formation face 1a. The lining layer 3 was formed by means of the evaporating apparatus 10 shown in FIG. 3. With Al as a target, electron beam B was irradiated from the electron gun 20 so as to heat. Consequently, it was formed in the thickness of 20 nm by vapor deposition.

Carbon protective film was formed on the lining layer 3 also according to the CVD method and then, by coating the carbon protective film with perfluoropolyether, lubricant layer was formed.

After that, the specimen was cut in the width of 8 mm so as to produce a magnetic tape for sample.

EXAMPLE 2

With Al as a target, by irradiating with electron beam B from the electron gun 20 in the evaporating apparatus 10 shown in FIG. 3 so as to heat, the lining layer 3 was formed in the thickness of 50 nm by vapor deposition.

With other condition equal to the above-described example 1, a sample magnetic tape was produced.

EXAMPLE 3

With Al as a target, by irradiating with electron beam B from the electron gun 20 in the evaporating apparatus 10 shown in FIG. 3 so as to heat, the lining layer 3 was formed in the thickness of 100 nm by vapor deposition.

With other condition equal to the above-described example 1, a sample magnetic tape was produced.

EXAMPLE 4

With Al as a target, by irradiating with electron beam B from the electron gun 20 in the evaporating apparatus 10 shown in FIG. 3 so as to heat, the lining layer 3 was formed in the thickness of 150 nm by vapor deposition.

With other condition equal to the above-described example 1, a sample magnetic tape was produced.

EXAMPLE 5

With Al as a target, by irradiating with electron beam B from the electron gun 20 in the evaporating apparatus 10 shown in FIG. 3 so as to heat, the lining layer 3 was formed in the thickness of 200 nm by vapor deposition.

With other condition equal to the above-described example 1, a sample magnetic tape was produced.

COMPARATIVE EXAMPLE 1

With Al as a target, by irradiating with electron beam B from the electron gun 20 in the evaporating apparatus 10 shown in FIG. 3 so as to heat, the lining layer 3 was formed in the thickness of 10 nm by vapor deposition.

With other condition equal to the above-described example 1, a sample magnetic tape was produced.

COMPARATIVE EXAMPLE 2

With Al as a target, by irradiating with electron beam B from the electron gun 20 in the evaporating apparatus 10 shown in FIG. 3 so as to heat, the lining layer 3 was formed in the thickness of 500 nm by vapor deposition.

With other condition equal to the above-described example 1, a sample magnetic tape was produced.

Young's modulus of elastically Gpa, contact waveform envelope cut-out amount dB and cupping % were measured and evaluated about the sample magnetic tapes produced in the example 1–example 5 and the comparative examples, 1, 2. Table 1 shows a result of the evaluation.

Meanwhile, as for the contact waveform envelope cut-out amount dB, using TR4171 type spectrum analyzer made by Advantest, an obtained output waveform (envelope) was measured with an oscilloscope under the condition of RBW=10 kHz, VBW=30 kHz, frequency span=0 MHz, sweep time=40 ms and average=16 times. As shown in FIG. 6, the contact waveform envelope cut-out amount was calculated according to the maximum value B and the minimum value A of the output waveform.

cut-out amount dB=20log (A/B)

The smaller the cut-out amount calculated according to the above expression, the better the head touch is. As a deck for use at this time, a marketed Sony's digital video (VX-1000) was modified and loaded with an MR head.

TABLE 1

|  | Thickness of lining layer [nm] | Young's modules of elasticity in width direction [Gpa] | contact waveform envelope cut-out amount [dB] | cupping [%] |
|---|---|---|---|---|
| Example 1 | 20 | 10.6 | −1.8 | 1.8 |
| Example 2 | 50 | 12.4 | −1.5 | 2.4 |
| Example 3 | 100 | 14.6 | −0.6 | 3.6 |
| Example 4 | 150 | 16.5 | −0.9 | 4.2 |
| Example 5 | 200 | 17.2 | −1.2 | 5.0 |
| Comparative Example 1 | 10 | 7.9 | −3.6 | 1.2 |
| Comparative Example 2 | 500 | 18.3 | −3.3 | 10.2 |

The metallic thin film magnetic recording medium 100 whose nonmagnetic supporting body 1 is in the thickness of 5 µm or less as shown in Table 1 is comprised of the thin magnetic layer 2 having the thickness of 20 nm–100 nm and the lining layer having the thickness 20–200 nm formed of metal, non-metal or alloy thereof or oxide compound on a main face opposite to that side of the magnetic layer formation face according to the vacuum thin film formation technology. As regards the samples of the example 1–example 5, Young's modulus of elasticity of 10.0 Gpa in the width direction was obtained and a practically sufficient mechanical strength was secured. Further, because the thickness of the lining layer 3 was 20–200 nm, the cupping could be reduced to less than 10.0% and the shape of the magnetic tape could be improved. Consequently, the contact waveform envelope cut-out amount was reduced to less than −2.0 dB so that a stabilized traveling performance was secured.

On the other hand, the magnetic tape of the comparative example 1 refers to the case where the thickness of the lining layer was 10 nm. In this example, the effect of raising the mechanical strength was so small that no sufficient stiffness was secured and the contact waveform envelope cut-out amount was −3.6 dB, thereby worsening the traveling performance.

The magnetic tape of the comparative example 2 refers to the case where the thickness of the lining layer was 500 nm. In this case, because the lining layer was formed thick, its film stress increased too much so that the curl and the cupping are enlarged and the contact waveform envelope cut-out amount was deteriorated.

Next, about the magnetic tapes according to the example 6–example 9 and comparative examples 3, 4 produced by changing the film thickness of the magnetic layer 2, the reproduction output dB and the coercive force kA/m were measured.

In a following case, a MIG (Metal in Gap) head was used for the recording head and the reproduction head.

EXAMPLE 6

The magnetic layer 2 was formed in the thickness of 100 nm. With other condition equal to the above-described example 1, a sample magnetic tape was produced.

EXAMPLE 7

The magnetic layer 2 was formed in the thickness of 140 nm. With other condition equal to the above-described example 1, a sample magnetic tape was produced.

EXAMPLE 8

The magnetic layer 2 was formed in the thickness of 160 nm. With other condition equal to the above-described example 1, a sample magnetic tape was produced.

EXAMPLE 9

The magnetic layer 2 was formed in the thickness of 200 nm. With other condition equal to the above-described example 1, a sample magnetic tape was produced.

COMPARATIVE EXAMPLE 3

The magnetic layer 2 was formed in the thickness of 80 nm. With other condition equal to the above-described example 1, a sample magnetic tape was produced.

COMPARATIVE EXAMPLE 4

The magnetic layer 2 was formed in the thickness of 250 nm. With other condition equal to the above-described example 1, a sample magnetic tape was produced.

As regards the sample magnetic tapes of the above-described example 7–example 9 and the comparative examples 3, 4, reproduction output dB and coercive force kA/m of a case where the MIG head was used for the recording head and the reproduction head were measured.

Table 2 shows a measurement result.

Meanwhile, with recording wavelength of 0.3 $\mu$m, those values were measured as a relative value to a reproduction output value of the example 8.

TABLE 2

| | thickness of magnetic layer [nm] | reproduction output [dB] | coercive force [kA/m] |
|---|---|---|---|
| Example 6 | 100 | −1.0 | 132 |
| Example 7 | 140 | −0.3 | 133 |
| Example 8 | 160 | 0.0 | 133 |
| Example 9 | 200 | 1.0 | 135 |
| Comparative Example 3 | 80 | −2.4 | 128 |
| Comparative Example 4 | 250 | 0.8 | 133 |

In the example 7–example 9 in which the thickness of the magnetic layer 2 was 100–200 nm as shown in Table 2, even when an inductive head like the MIG head was used as the reproduction head, a sufficient reproduction output for actual use was obtained.

On the other hand, in the comparative example 3 in which the thickness of the magnetic layer 2 was 100 nm or less, no sufficient reproduction output was obtained.

In the comparative example 4 in which the thickness of the magnetic layer 2 was over 200 nm, the reproduction output was not improved as compared to the example 6–example 9 because of thickness loss, and conversely, noise increased so that S/N ratio deteriorated.

That is, if the inductive head like the MIG head was employed as the reproduction head, it is preferred that the thickness of the magnetic layer is 100–200 nm.

Next, as for the magnetic tapes of example 10–example 13 and comparative examples 5, 6 in which the shield type magneto resistive (MR) head was employed as the recording head and reproduction head and the film thickness of the magnetic layer 2 was changed like the cases described previously, its reproduction output dB and coercive force kA/m were measured.

EXAMPLE 10

The magnetic layer 2 was formed in the thickness of 20 nm. With other condition equal to the above-described example 1, a sample magnetic tape was produced.

EXAMPLE 11

The magnetic layer 2 was formed in the thickness of 50 nm. With other condition equal to the above-described example 1, a sample magnetic tape was produced.

EXAMPLE 12

The magnetic layer 2 was formed in the thickness of 80 nm. With other condition equal to the above-described example 1, a sample magnetic tape was produced.

The magnetic layer 2 was formed in the thickness of 100 nm. With other condition equal to the above-described example 1, a sample magnetic tape was produced.

COMPARATIVE EXAMPLE 5

The magnetic layer 2 was formed in the thickness of 10 nm. With other condition equal to the above-described example 1, a sample magnetic tape was produced.

COMPARATIVE EXAMPLE 6

The magnetic layer 2 was formed in the thickness of 150 nm. With other condition equal to the above-described example 1, a sample magnetic tape was produced.

As regards the sample magnetic tapes of the above-described example 10–example 13 and the comparative examples 5, 6, reproduction output dB and coercive force kA/m of a case where a shield type MIG head was used for the recording head and the reproduction head were measured.

Table 3 shows a measurement result.

Meanwhile, with recording wavelength of 0.3 $\mu$m, those values were measured as a relative value to a reproduction output value of the example 11.

TABLE 3

| | thickness of magnetic layer [nm] | reproduction output [dB] | coercive force [kA/m] |
|---|---|---|---|
| Example 10 | 20 | −1.2 | 128 |
| Example 11 | 50 | 0.0 | 132 |
| Example 12 | 80 | 0.8 | 130 |
| Example 13 | 100 | 1.0 | 133 |
| Comparative Example 5 | 10 | −3.4 | 98 |
| Comparative Example 6 | 150 | 0.7 | 133 |

In the example 10–example 13 in which the thickness of the magnetic layer 2 was 20–100 nm as shown in Table 3, a sufficient reproduction output was obtained without saturating the head.

On the other head, in the comparative example 5 in which the thickness of the magnetic layer 2 was less than 20 nm, no sufficient reproduction output was obtained.

Further, in the comparative example 6 in which the thickness of the magnetic layer 2 was over 100 nm, the MR device was saturated and noise increased, so that S/N ratio deteriorated.

That is, if the shield type MR head was utilized as the reproduction head, it is preferred that the thickness of the magnetic layer is 20–100 nm.

Next, as for the magnetic tapes of example 14–example 17 and comparative examples 7, 8 in which a higher sensitivity giant magneto resistive (GMR) head was employed as the recording head and reproduction head and the film thickness of the magnetic layer 2 was changed like the cases described previously, its reproduction output dB and coercive force kA/m were measured.

EXAMPLE 14

As the magnetic layer 2, CoCrPt layer was formed in the thickness of 10 nm via Cr foundation layer.

With other condition equal to the above-described example 1, a sample magnetic tape was produced.

EXAMPLE 15

As the magnetic layer 2, CoCrPt layer was formed in the thickness of 20 nm via Cr foundation layer.

With other condition equal to the above-described example 1, a sample magnetic tape was produced.

EXAMPLE 16

As the magnetic layer 2, CoCrPt layer was formed in the thickness of 30 nm via Cr foundation layer.

With other condition equal to the above-described example 1, a sample magnetic tape was produced.

EXAMPLE 17

As the magnetic layer 2, CoCrPt layer was formed in the thickness of 50 nm via Cr foundation layer.

With other condition equal to the above-described example 1, a sample magnetic tape was produced.

COMPARATIVE EXAMPLE 7

As the magnetic layer 2, CoCrPt layer was formed in the thickness of 5 nm via Cr foundation layer.

With other condition equal to the above-described example 1, a sample magnetic tape was produced.

COMPARATIVE EXAMPLE 8

As the magnetic layer 2, CoCrPt layer was formed in the thickness of 80 nm via Cr foundation layer.

With other condition equal to the above-described example 1, a sample magnetic tape was produced.

As regards the sample magnetic tapes of the above-described example 14–example 17 and the comparative examples 7, 8, reproduction output dB and coercive force kA/m of a case where the GMR head was used for the recording head and the reproduction head were measured. Table 4 shows a measurement result. Meanwhile, with recording wavelength of 0.3 μm, those values were measured as a relative value to a reproduction output value of the example 15.

TABLE 4

| | thickness of magnetic layer [nm] | reproduction output [dB] | coercive force [kA/m] |
|---|---|---|---|
| Example 14 | 10 | −2.1 | 121 |
| Example 15 | 20 | 0.0 | 155 |
| Example 16 | 30 | 0.4 | 160 |
| Example 17 | 50 | 0.3 | 158 |
| Comparative Example 7 | 5 | −4.6 | 60 |
| Comparative Example 8 | 80 | 0.2 | 158 |

In the example 14–example 17 in which the thickness of the magnetic layer 2 was 10–50 nm as shown in Table 4, a sufficient reproduction output was obtained without saturating the GMR head.

On the other head, in the comparative example 7 in which the thickness of the magnetic layer 2 was less than 10 nm, no sufficient reproduction output was obtained.

Further, in the comparative example 8 in which the thickness of the magnetic layer 2 was over 50 nm, the GMR device was saturated and noise increased, so that S/N ratio deteriorated.

That is, if the GMR head was utilized as the reproduction head, it is preferred that the thickness of the magnetic layer is 10–50 nm.

Next, a sample magnetic tape was produced by changing the thickness of the protective film 4 composing the metallic thin film magnetic recording medium 100 and a reproduction output dB and a level down dB were measured using the MR head.

EXAMPLE 18

As the protective layer 4, diamond-like carbon layer was formed in the thickness of 4 nm.

With other condition equal to the above-described example 1, a sample magnetic tape was produced.

EXAMPLE 19

As the protective layer 4, diamond-like carbon layer was formed in the thickness of 8 nm.

With other condition equal to the above-described example 1, a sample magnetic tape was produced.

EXAMPLE 20

As the protective layer 4, diamond-like carbon layer was formed in the thickness of 15 nm.

With other condition equal to the above-described example 1, a sample magnetic tape was produced.

COMPARATIVE EXAMPLE 9

As the protective layer 4, diamond-like carbon layer was formed in the thickness of 2 nm.

With other condition equal to the above-described example 1, a sample magnetic tape was produced.

COMPARATIVE EXAMPLE 10

As the protective layer 4, diamond-like carbon layer was formed in the thickness of 20 nm.

With other condition equal to the above-described example 1, a sample magnetic tape was produced.

As regards the sample magnetic tapes of the above-described example 18–example 20 and the comparative examples 9, 10, reproduction output dB and level down dB of a case where the MR head was used for the recording head and the reproduction head were measured. Table 5 shows a measurement result.

Meanwhile, with recording wavelength of 0.3 μm, those values were measured as a relative value to a reproduction output value of the example 19.

TABLE 5

|  | thickness of magnetic layer [nm] | reproduction output [dB] | Level down amount [dB] |
| --- | --- | --- | --- |
| Example 18 | 4 | 1.2 | −2.0 |
| Example 19 | 8 | 0.0 | −1.5 |
| Example 20 | 15 | −2.8 | −1.2 |
| Comparative Example 9 | 2 | 1.8 | −6.2 |
| Comparative Example 10 | 20 | −3.5 | −1.0 |

In the example 18–example 20 in which the thickness of the protective layer 4 is 4–15 nm as shown in Table 5, a sufficient reproduction output for actual use was obtained and the level down amount was small, so that a sufficient traveling resistance was secured.

On the other hand, in the comparative example 9 in which the thickness of the protective layer 4 was less than 4 nm, although a sufficient output was gained under short wavelength, the level down amount was large, so that no sufficient traveling resistance was secured.

In the comparative example 10 in which the thickness of the protective layer 4 was over 15 nm, spacing loss increased, so that no sufficient output was gained under short wavelength.

As a result, it is preferable that the thickness of the protective layer 4 is formed on a thickness of 4 to 15 nm.

As evident from the above description, because, according to the metallic thin film magnetic recording medium 100 of the present invention, the magnetic layer 2 was formed in a thin film of 20–100 nm, it is preferable for a high sensitivity MR head. Further, because the lining layer 3 is formed on a main face opposite to the side of the magnetic layer 2 according to the thin film formation technology, even if the nonmagnetic supporting body 1, which is a cheap material and as thin as 5 μm or less, is employed, the mechanical strength of the magnetic tape can be raised to a sufficient level for actual use. As a result, the metallic thin film magnetic recording medium 100, which ensures a high recording density per unit weight and whose production cost is low, has been obtained.

Further, because the lining layer 3 is formed on the main face opposite to the magnetic layer according to the thin film formation technology, corrosion of magnetic component of the magnetic layer 2 is avoided effectively, so that corrosion resistance is improved and magnetization deterioration rate is reduced.

A back layer 5 (see FIG. 3) is formed in the thickness of 4–30 nm, on the surface of the lining layer 3 like the magnetic layer 2 in order to secure an excellent traveling resistance.

This back layer 5 can be formed of, for example, carbon material, so that the durability and corrosion resistance thereof are improved.

It is assumed that the topmost surface of the back layer formation face has a relative roughness factor of 2–15 nm.

Figure 2:
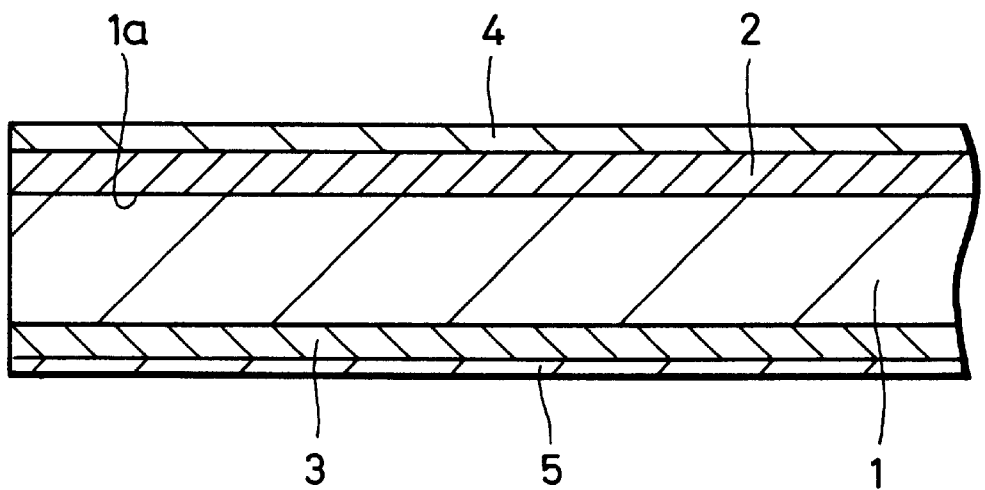
FIG. 2 is a schematic sectional view 2 of a metallic thin film magnetic recording medium of the present invention.

Next, a test for determining the thickness of an optimum back layer and Ra of the surface of the back layer was carried out. FIG. 2 shows a structure diagram thereof. Film formation condition and the like for other than the back layer were assumed to be the same as those in Example 1.

EXAMPLE 21

As the nonmagnetic supporting body 1 of the metallic thin film magnetic recording medium 100 shown in FIG. 2, polyethylene naphthalate film having the thickness of 4.0 μm and the width of 150 mm was prepared.

Next, the back layer 5 was formed on the lining layer 3 under the following condition (FIG. 2).
(Back Layer Formation Condition)
film formation method: CVD method
reactive gas: ethylene, argon
reactive gas pressure: 30 Pa
introduction power: 1.5 kVDC Lubricant was applied to the protective layer 4 and the back layer 5. Any lubricant may be used as long as it is a general product used for application to the magnetic tape. Particularly, lubricant whose main skeleton is fluorocarbon base, alkyl amine, alkyl ester or the like is preferable. Meanwhile, in this example, the lubricant whose main skeleton was fluorocarbon and which was modified with tertiary amine.

As the fluorocarbon, "DEMUNAMU" in product name made by DAIKIN KOGYO was used, while as the tertiary amine, dimethyl decylamine was used and these were synthesized so as to have a salt structure.

The relative roughness factor (Ra) of the topmost surface on the side of the lining layer formation face was 12.0 nm. The relative roughness factor (Ra) of the surface was calculated by observing the surface configuration using a SHIMADZU's scanning type probe microscope.

The thickness of the lining layer 3 and the back layer 5 formed by thin film formation process was measured by wrapping a sample with visible light setting resin (D-800), producing a sectional specimen according to microtome method and then observing with TEM.

After that, the specimen was cut in each width of 6.35 mm so as to prepare a sample magnetic tape.

EXAMPLE 22

The thickness of the nonmagnetic supporting body 1 was set to 2.0 μm while the thickness of the lining layer 3 was set to 50 nm. Consequently, the total thickness of the nonmagnetic supporting body 1 and the lining layer 3 was 2.050 μm.

The back layer 5 was formed in the thickness of 200 nm according to the CVD method. The relative roughness factor of the topmost surface on the side of the lining layer 3 formation face was 5.0 nm. With other condition equal to the example 1, a sample was produced.

EXAMPLE 23

The thickness of the nonmagnetic supporting body 1 was set to 2.5 μm while the thickness of the lining layer 3 was set to 350 nm. Consequently, the total thickness of the nonmagnetic supporting body 1 and the lining layer 3 was 2.850 μm.

The back layer 5 was formed in the thickness of 120 nm according to the CVD method. The relative roughness factor of the topmost surface on the side of the lining layer 3 formation face was 9.0 nm. With other condition equal to the example 21, a sample was produced.

EXAMPLE 24

The thickness of the nonmagnetic supporting body 1 was set to 3.0 μm while the thickness of the lining layer 3 was set to 50 nm. Consequently, the total thickness of the nonmagnetic supporting body 1 and the lining layer 3 was 3.050 μm.

The back layer 5 was formed in the thickness of 80 nm according to the CVD method. The relative roughness factor (Ra) of the topmost surface on the side of the lining layer 3 formation face was 15.0 nm. With other condition equal to the example 1, a sample was produced.

EXAMPLE 25

The thickness of the nonmagnetic supporting body 1 was set to 4.0 μm while the thickness of the lining layer 3 was set to 20 nm. Consequently, the total thickness of the nonmagnetic supporting body 1 and the lining layer 3 was 4.020 μm.

The back layer 5 was formed in the thickness of 100 nm according to the CVD method. The relative roughness factor (Ra) of the topmost surface on the side of the lining layer 3 formation face was 3.2 nm. With other condition equal to the example 1, a sample was produced.

EXAMPLE 26

The thickness of the nonmagnetic supporting body 1 was set to 2.0 μm while the thickness of the lining layer 3 was set to 500 nm. Consequently, the total thickness of the nonmagnetic supporting body 1 and the lining layer 3 was 2.500 μm.

The back layer 5 was formed in the thickness of 20 nm according to the CVD method.
(Back Layer Formation Condition)
target: carbon
gas for use: argon The relative roughness factor (Ra) of the topmost surface on the side of the lining layer 3 formation face was 4.8 nm. With other condition equal to the example 1, a sample was produced.

EXAMPLE 27

The thickness of the nonmagnetic supporting body 1 was set to 3.8 μm while the thickness of the lining layer 3 was set to 45 nm. Consequently, the total thickness of the nonmagnetic supporting body 1 and the lining layer 3 was 3.845 μm.

The back layer 5 was formed in the thickness of 200 nm by sputtering under the same condition as the above-described example 26. The relative roughness factor (Ra) of the topmost surface on the side of the lining layer 3 formation face was 11.5 nm. With other condition equal to the example 1, a sample was produced.

EXAMPLE 28

The thickness of the nonmagnetic supporting body 1 was set to 4.0 μm while the thickness of the lining layer 3 was set to 100 nm. Consequently, the total thickness of the nonmagnetic supporting body 1 and the lining layer 3 was 4.100 μm.

The back layer 5 was formed in the thickness of 100 nm by sputtering under the same condition as the above-described example 26. The relative roughness factor (Ra) of the topmost surface on the side of the lining layer 3 formation face was 2.0 nm. With other condition equal to the example 1, a sample was produced.

EXAMPLE 29

The thickness of the nonmagnetic supporting body 1 was set to 2.5 μm while the thickness of the lining layer 3 was set to 30 nm. Consequently, the total thickness of the nonmagnetic supporting body 1 and the lining layer 3 was 2.530 μm.

The back layer 5 was formed in the thickness of 180 nm by sputtering under the same condition as the above-described example 26. The relative roughness factor (Ra) of the topmost surface on the side of the lining layer 3 formation face was 8.3 nm. With other condition equal to the example 1, a sample was produced.

EXAMPLE 30

The thickness of the nonmagnetic supporting body 1 was set to 4.7 μm while the thickness of the lining layer 3 was set to 300 nm. Consequently, the total thickness of the nonmagnetic supporting body 1 and the lining layer 3 was 5.000 μm.

The back layer 5 was formed in the thickness of 10 nm by sputtering under the same condition as the above-described example 26. The relative roughness factor (Ra) of the topmost surface on the side of the lining layer 3 formation face was 2.5 nm. With other condition equal to the example 1, a sample was produced.

COMPARATIVE EXAMPLE 11

The thickness of the nonmagnetic supporting body 1 was set to 4.0 μm while the thickness of the lining layer 3 was set to 15 nm. Consequently, the total thickness of the nonmagnetic supporting body 1 and the lining layer 3 was 4.015 μm.

The back layer 5 was formed in the thickness of 180 nm according to the CVD method. The relative roughness factor (Ra) of the topmost surface on the side of the lining layer 3 formation face was 10.8 nm. With other condition equal to the example 1, a sample was produced.

COMPARATIVE EXAMPLE 12

The thickness of the nonmagnetic supporting body 1 was set to 3.5 μm while the thickness of the lining layer 3 was set to 50 nm. Consequently, the total thickness of the nonmagnetic supporting body 1 and the lining layer 3 was 3.550 μm.

The back layer 5 was formed in the thickness of 250 nm according to the CVD method. The relative roughness factor (Ra) of the topmost surface on the side of the lining layer 3 formation face was 16.0 nm. With other condition equal to the example 1, a sample was produced.

COMPARATIVE EXAMPLE 13

The thickness of the nonmagnetic supporting body 1 was set to 2.5 μm while the thickness of the lining layer 3 was set to 250 nm. Consequently, the total thickness of the nonmagnetic supporting body 1 and the lining layer 3 was 2,750 μm.

The back layer 5 was formed in the thickness of 5 nm according to the CVD method. The relative roughness factor (Ra) of the topmost surface on the side of the lining layer 3 formation face was 2.0 nm. With other condition equal to the example 1, a sample was produced.

COMPARATIVE EXAMPLE 14

The thickness of the nonmagnetic supporting body 1 was set to 4.0 μm while the thickness of the lining layer 3 was set to 40 nm. Consequently, the total thickness of the nonmagnetic supporting body 1 and the lining layer 3 was 4.040 μm.

The back layer 5 was formed in the thickness of 50 nm by sputtering method. The relative roughness factor (Ra) of the topmost surface on the side of the lining layer 3 formation face was 1.8 nm. With other condition equal to the example 1, a sample was produced.

COMPARATIVE EXAMPLE 15

The thickness of the nonmagnetic supporting body 1 was set to 1.8 μm while the thickness of the lining layer 3 was set to 150 nm. Consequently, the total thickness of the nonmagnetic supporting body 1 and the lining layer 3 was 1.950 μm.

The back layer 5 was formed in the thickness of 30 nm by sputtering method. The relative roughness factor (Ra) of the topmost surface on the side of the lining layer 3 formation face was 12.5 nm. With other condition equal to the example 1, a sample was produced.

COMPARATIVE EXAMPLE 16

The thickness of the nonmagnetic supporting body 1 was set to 1.8 μm while the thickness of the lining layer 3 was set to 525 nm. Consequently, the total thickness of the nonmagnetic supporting body 1 and the lining layer 3 was 2.325 μm.

The back layer 5 was formed in the thickness of 25 nm by sputtering method. The relative roughness factor (Ra) of the topmost surface on the side of the lining layer 3 formation face was 4.2 nm. With other condition equal to the example 1, a sample was produced.

As regards the sample magnetic tapes according to the example 21–example 30 and comparative examples 11–16 produced in the above manner, coefficient of friction was measured and further, an envelope cut-out amount dB was measured as index of head touch.

As for the measurement of coefficient of friction, maximum static frictional coefficient and dynamic frictional coefficient were measured.

When the maximum static frictional coefficient was measured, the back layer formation face of the magnetic tape was applied to a polyacetal resin (polyoxymethylene: POM) guide having a diameter of 5 mm at a wrapping angle of 10°.

As for the dynamic frictional coefficient, the magnetic tape was slid against a guide made by SUS having the diameter of 2.0 mm at a wrapping angle of 90° 100 times and frictional coefficient at the 100th time of sliding was measured.

Figure 8:
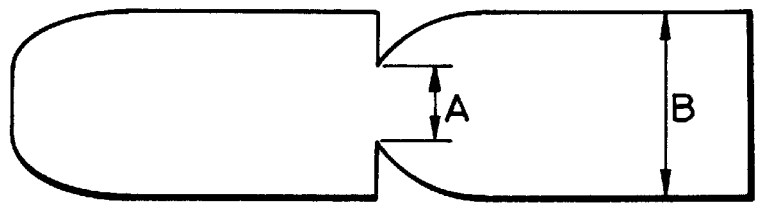
FIG. 8 is a diagram showing the state of contact waveform.

As for the envelope cut-out amount, using TR4171 type spectrum analyzer made by Advantest, an obtained output waveform (envelope) was measured with an oscilloscope under the condition of RBW=10 kHz, VBW=30 kHz, frequency span=0 MHz, sweep time=40 ms and average=16 times. As shown in FIG. 8, the envelope cut-out amount was calculated according to the maximum value B and the minimum value A of the output waveform.

cut-out amount dB=20log (A/B)

The smaller the cut-out amount calculated according to the above expression, the better the head touch is. As a deck for use at this time, a marketed Sony's digital video (VX-1000) was modified and loaded with a MR head.

Table 6 shows production condition of the magnetic tapes according to the example 21–example 30 and comparative examples 11–16, and measurement results of envelope cut-out amount and frictional coefficient.

TABLE 6

| | thickness of non-magnetic supporting body [μm] | film thickness of lining layer [nm] | total of the thickness of non-magnetic supporting body and the thickness of lining layer [μm] | back layer formation method | thickness of back layer [nm] | relative roughness factor (Ra) of topmost surface on the side of back layer [nm] | envelope cut-out amount [dB] | maximum static frictional coefficient | dynamic frictional coefficient (after 100 pass) | magnetic tape evaluation |
|---|---|---|---|---|---|---|---|---|---|---|
| Example 21 | 4.0 | 20 | 4.020 | CVD | 100 | 12.0 | 0.4 | 0.22 | 0.21 | ○ |
| Example 22 | 2.0 | 50 | 2.050 | CVD | 200 | 5.0 | 2.1 | 0.25 | 0.24 | ○ |
| Example 23 | 2.5 | 350 | 2.850 | CVD | 120 | 9.0 | 1.4 | 0.22 | 0.25 | ○ |
| Example 24 | 3.0 | 50 | 3.050 | CVD | 80 | 15.0 | 1.3 | 0.21 | 0.20 | ○ |
| Example 25 | 4.0 | 20 | 4.020 | CVD | 100 | 3.2 | 0.1 | 0.29 | 0.28 | ○ |
| Example 26 | 2.0 | 500 | 2.500 | sputtering | 20 | 4.8 | 1.7 | 0.26 | 0.22 | ○ |
| Example 27 | 3.8 | 45 | 3.845 | sputtering | 200 | 11.5 | 1.0 | 0.20 | 0.19 | ○ |
| Example 28 | 4.0 | 100 | 4.100 | sputtering | 100 | 2.0 | 0.0 | 0.30 | 0.31 | ○ |

TABLE 6-continued

| | thickness of non-magnetic supporting body [μm] | film thickness of lining layer [nm] | total of the thickness of non-magnetic supporting body and the thickness of lining layer [μm] | back layer formation method | thickness of back layer [nm] | relative roughness factor (Ra) of topmost surface on the side of back layer [nm] | envelope cut-out amount [dB] | maximum static frictional coefficient | dynamic frictional coefficient (after 100 pass) | magnetic tape evaluation |
|---|---|---|---|---|---|---|---|---|---|---|
| Example 29 | 2.5 | 30 | 2.530 | sputtering | 180 | 8.3 | 2.4 | 0.24 | 0.24 | ○ |
| Example 30 | 4.7 | 300 | 5.000 | sputtering | 10 | 2.5 | 2.3 | 0.31 | 0.29 | ○ |
| Comparative Example 11 | 4.0 | 15 | 4.015 | CVD | 180 | 10.8 | 12 | 0.19 | 0.18 | x |
| Comparative Example 12 | 3.5 | 50 | 3.550 | CVD | 250 | 16.0 | 1.3 | 0.21 | occurrence of sliding | x |
| Comparative Example 13 | 2.5 | 250 | 2.750 | CVD | 5 | 2.0 | 4.0 | back layer separation | | x |
| Comparative Example 14 | 4.0 | 40 | 4.040 | sputtering | 50 | 1.8 | 1.2 | adhesion | | x |
| Comparative Example 15 | 1.8 | 150 | 1.950 | sputtering | 30 | 12.5 | 19 | 0.21 | 0.20 | x |
| Comparative Example 16 | 1.8 | 525 | 2.325 | sputtering | 25 | 4.2 | 3.7 | 0.35 | 0.24 | x |

For the magnetic tapes shown in Table 6, a target of the envelope cut-out amount is 4.0 dB or less. In the evaluation of the magnetic tape, if the frictional coefficient is less than 0.32 while no separation or generation of damage is found in both the magnetic layer and the back layer, it is marked with a circle and in case where sliding damage or separation is generated, it is marked with a cross.

The example 21–30 shown in Table 6 refer to the metallic thin film magnetic recording medium 100 having the magnetic layer 2 formed on a main face of the nonmagnetic supporting body 1 according to the vacuum thin film formation technology, in which the thickness of the magnetic layer 2 is 100 nm or less, the thickness of the lining layer is 20–500 nm, the total of the thickness of the nonmagnetic supporting body 1 and the thickness of the lining layer 3 is 2–5 μm, the back layer 5 is formed in the thickness of 10–200 nm, and the relative roughness factor (Ra) of the topmost surface of the back layer formation face is 2–15 nm. In these tapes, although the nonmagnetic supporting body 1 was formed as thin as 2.0 μm in order to achieve thinning of the magnetic tape, a sufficient mechanical strength of the entire magnetic tape was achieved by the lining layer 3 and the back layer 5, so that head contact and traveling stability of these tapes were excellent and the evaluation of the magnetic tape configuration was also favorable.

Further, in the metallic thin film magnetic recording medium of the present invention, by limiting the relative roughness factor of the back layer formation face in a range of 2–15 nm, the frictional coefficient was reduced and the head contact was excellent and the aforementioned envelope cut-out amount dB was less than 4.0 dB in any case, which was a favorable value for actual use.

Further, no separation or damage was generated in the surface and the evaluation of the configuration of the magnetic tape was excellent in any case.

As for the magnetic tape of the comparative example 11, the thickness of the lining layer 3 was so small that improvement of the mechanical strength could not be achieved. As a result, head contact failure was induced because of shortage of stiffness, so that the envelope cut-out amount increased to 12 dB.

As for the magnetic tape of the comparative example 12, the thickness of the back layer 5 was as large as 250 nm and the relative roughness factor (Ra) increased. Consequently, sliding flaw was generated upon measurement of frictional coefficient, so that the evaluation of the configuration of the magnetic tape worsened.

In the magnetic tape of the comparative example 13, the thickness of the back layer 5 was as small as 5 nm, so that upon measurement of frictional coefficient, separation occurred in the back layer 5. Consequently, the evaluation of the configuration of the magnetic tape worsened.

In the magnetic tape of the comparative example 14, the relative roughness factor (Ra) was as small as 1.8 nm and the friction was too high, so that upon measurement of the frictional coefficient, it adhered to the evaluation guides (POM, SUS). Consequently, the evaluation of the configuration of the magnetic tape worsened.

In the magnetic tape of the comparative example 15, the thickness of the nonmagnetic supporting body 1 was as small as 1.8 μm and the lining layer 3 was formed in the thickness of 150 nm. Because the nonmagnetic supporting body 1 was too thin, even if the lining layer 3 was formed in the thickness of 150 nm, the total of these thicknesses is less than 2 μm, so that no sufficient mechanical strength could be obtained. Consequently, the head contact worsened and the envelope cut-out amount dB was enlarged.

In the magnetic tape of the comparative example 16, the lining layer 3 was formed in the thickness of 525 nm and the friction on the topmost surface was increased, so that the head contact worsened.

Further, because the lining layer 3 was formed in an extremely large thickness as compared to the thickness of the magnetic layer 2 formed on a main face on an opposite side, curl and cupping failure occur in the magnetic tape, so that the evaluation of the configuration of the magnetic tape worsens.

As evident from the results of the example 21–example 30, and the comparative example 11-comparative example 16, the metallic thin film magnetic recording medium 100 of the present invention is preferable for a high sensitivity MR head. Thinning of the magnetic layer 2 and the nonmagnetic supporting body 1 is achieved so that recording density per unit volume is improved. Further, because the lining layer 3 is formed on a main face on an opposite side to the magnetic layer 2, even if the nonmagnetic supporting body 1 is formed in a thin shape by employing conventional cheap material, a sufficient mechanical strength can be maintained without using the nonmagnetic supporting body 1 of expensive material. Consequently, reduction of production cost is achieved. Further, because a sufficient stiffness is obtained, durability, traveling stability and contact with the magnetic head are improved.

Because the thickness of the lining layer 3 and the back layer 5 was numerically restricted as described above, the roughness factor (Ra) of the topmost surface was controlled so as to improve the configuration of the magnetic tape.

Because the lining layer was formed on a main face on an opposite side to the magnetic layer, a reception of a bad influence from external environment was avoided so as to improve the storage characteristic.

Because the lining layer was formed and further, the back layer was formed on the lining layer according to vacuum vapor deposition method such as the CVD method and sputtering method or coating method, control of the relative roughness factor of the surface was achieved. By specifying the relative roughness factor Ra to be 2–15 nm, the head contact and the traveling stability were improved, so that the durability of the magnetic head was also improved.

Next, experiments on light transmittance and permeating water vapor amount were carried out.

The metallic thin film magnetic recording medium 100 of the present invention will be described about specific examples and comparative examples. However, the metallic thin film magnetic recording medium of the present invention is not restricted to the examples described below.

EXAMPLE 31

As the nonmagnetic supporting body 1 of the metallic thin film magnetic recording medium 100 shown in FIG. 1, polyethylene terephthalate film 4.8 μm in thickness, 150 nm in width was prepared.

First, a coating layer (not shown) was formed on the magnetic layer formation face 1a of the nonmagnetic supporting body 1. The coating layer was formed by agitating silica particles each having the diameter of 25 nm in water-soluble latex composed of mainly acrylic ester and coating therewith at a density of about $10^7/mm^2$.

On the other hand, the coating layer (not shown) was formed on the lining layer formation face 3a of the nonmagnetic supporting body 1. In this case, it was formed by agitating silica particles each having the diameter of 40 nm in water-soluble latex composed of mainly acrylic ester and coating therewith at a density of about $10^7/mm^2$.

Next, the magnetic layer 2 was formed using the evaporating apparatus 10 shown in FIG. 3. Assuming the metallic magnetic material 19 to be Co, oxygen was introduced from the oxygen gas introduction pipe 24 by $6.0 \times 10^{-4}$ [$m^3$/minute], and electron beam B was irradiated with the electron gun 20 so as to heat the metallic magnetic material 19. As a result, Co—CoO base magnetic layer was formed in the thickness of 50 nm according to reactive vacuum vapor deposition.

At this time, a minimum incident angle and a maximum incident angle of the Co evaporated particle were adjusted to 45° and 90° respectively by the shutter 23.

The carbon protective layer 4 was formed on the magnetic layer 2. The carbon protective layer 4 was formed in the thickness of 10 nm according to the CVD method. After that, by coating the carbon protective film with perfluoropolyester, lubricant layer was formed.

Next, the lining layer 3 was formed on a main face opposite to the magnetic layer formation face 1a. The lining layer 3 was formed by means of the evaporating apparatus 10 shown in FIG. 3. With Al as a target, electron beam B was irradiated from the electron gun 20 so as to heat. Consequently, it was formed in the thickness of 50 nm by vapor deposition.

At this time, the minimum incident angle and the maximum incident angle of the Al evaporated particle were adjusted to 0° and 30° respectively.

Carbon protective film was formed on the lining layer 3 also according to the CVD method and then, by coating the carbon protective film with perfluoropolyether, lubricant layer was formed.

After that, the specimen was cut in the width of 8 mm so as to produce a magnetic tape for sample.

EXAMPLE 32

The lining layer 3 was heated by irradiating electron beam B from the electron gun 20 with Co as a target in the evaporating apparatus 10 shown in FIG. 3 so as to form a film 80 nm in thickness by vapor deposition.

At this time, the minimum incident angle and the maximum incident angle of the Co evaporated particle were adjusted to 45° and 90° respectively with the shutter 23.

With other condition equal to the above-described example 1, a sample magnetic tape was produced.

EXAMPLE 33

By heating the lining layer 3 by introducing oxygen from the oxygen gas introduction pipe 24 by $5.0 \times 10^{-4}$ [$m^3$/minute] with Co as a target and irradiating electron beam B from the electron gun 20 in the evaporating apparatus 10 shown in FIG. 3, Co—CoO base magnetic metallic layer was formed in the thickness of 80 nm by reactive vapor deposition.

At this time, the minimum incident angle and the maximum incident angle of the Co evaporated particle were adjusted to 45° and 90° respectively with the shutter 23.

With other condition equal to the above-described example 1, a sample magnetic tape was produced.

EXAMPLE 34

By heating the lining layer 3 by introducing oxygen from the oxygen gas introduction pipe 24 by $1.0 \times 10^{-3}$ [$m^3$/minute] with Co as a target and irradiating electron beam B from the electron gun 20 in the evaporating apparatus 10 shown in FIG. 3, Co—CoO base magnetic metallic layer was formed in the thickness of 80 nm by reactive vapor deposition.

At this time, the minimum incident angle and the maximum incident angle of the Co evaporated particle were adjusted to 45° and 90° respectively with the shutter 23.

With other condition equal to the above-described example 1, a sample magnetic tape was produced.

EXAMPLE 35

As the lining layer 3, CoPt layer was formed in the thickness of 50 nm by RF sputtering in a conventionally well-known sputtering apparatus.

With other condition equal to the above-described example 1, a sample magnetic tape was produced.

EXAMPLE 36

As the nonmagnetic supporting body 1, polyamide film 2.5 μm in thickness was used. By heating the lining layer 3 by introducing oxygen from the oxygen gas introduction pipe 24 by $5.0 \times 10^{-4}$ [m³/minute] with Co as a target and irradiating electron beam B from the electron gun 20 in the evaporating apparatus 10 shown in FIG. 3, Co—CoO base magnetic metallic layer was formed in the thickness of 80 nm by reactive vapor deposition.

At this time, the minimum incident angle and the maximum incident angle of the Co evaporated particle were adjusted to 45° and 90° respectively with the shutter 23.

With other condition equal to the above-described example 1, a sample magnetic tape was produced.

COMPARATIVE EXAMPLE 17

By applying coating medium composed of carbon and urethane resin in the thickness of 0.5 μm after drying and drying it, the lining layer 3 was formed as a back coating layer.

With other condition equal to the above-described example 1, a sample magnetic tape was produced.

COMPARATIVE EXAMPLE 18

As the nonmagnetic supporting body 1, polyethylene terephthalate having the thickness of 6.4 μm was used.

By coating with coating medium composed of carbon and urethane resin in the thickness of 0.5 μm after drying and drying it, the lining layer 3 was formed as the back coating layer.

With other condition equal to the above-described example 1, a sample magnetic tape was produced.

COMPARATIVE EXAMPLE 19

The lining layer 3 was formed with the evaporating apparatus 10 shown in FIG. 3. By irradiating electron beam B from the electron gun 20 with Al as a target so as to heat, it was formed in the thickness of 5 nm by vapor deposition.

With other condition equal to the above-described example 1, a sample magnetic tape was produced.

COMPARATIVE EXAMPLE 20

The lining layer 3 was formed with the evaporating apparatus 10 shown in FIG. 3. By irradiating electron beam B from the electron gun 20 with Al as a target so as to heat, it was formed in the thickness of 150 nm by vapor deposition.

With other condition equal to the above-described example 1, a sample magnetic tape was produced.

COMPARATIVE EXAMPLE 21

As the nonmagnetic supporting body 1, polyamide film having the thickness of 4.4 μm was used. By coating with coating medium composed of carbon and urethane resin in the thickness of 0.5 μm after drying and drying it, the lining layer 3 was formed as the back coating layer.

With other condition equal to the above-described example 1, a sample magnetic tape was produced.

COMPARATIVE EXAMPLE 22

As the nonmagnetic supporting body 1, polyamide film having the thickness of 2.5 μm was used. By coating with coating medium composed of carbon and urethane resin in the thickness of 0.5 μm after drying and drying it, the lining layer 3 was formed as the back coating layer.

With other condition equal to the above-described example 1, a sample magnetic tape was produced.

COMPARATIVE EXAMPLE 23

By, with Co as a target, irradiating electron beam B from the electron gun 20 in the evaporating apparatus 10 shown in FIG. 3 so as to heat, the lining layer 3 was formed in the thickness of 105 nm by reactive vapor deposition.

At this time, the minimum incident angle and the maximum incident angle of the Co evaporated particle were adjusted to 45° and 90° respectively with the shutter 23. The oxygen introduction amount was set to $1.4 \times 10^{-3}$ [m³/minute].

With other condition equal to the above-described example 1, a sample magnetic tape was produced.

As regards the sample magnetic tapes produced in the example 31–example 36 and the comparative example 17–comparative example 23, Young's modulus of elasticity [Mpa], nonmagnetic supporting body thickness [μm], Young's modulus of elasticity x nonmagnetic supporting body thickness) [Pa·m], light transmittance [%], permeating water vapor amount [g/m²·day], configuration of the magnetic tape and magnetization deterioration rate were evaluated. Table 7 shows the evaluation result.

TABLE 7

|  | Young's modulus of elasticity [MPa] | Nonmagnetic supporting body thickness [μm] | Young's modulus of elasticity x nonmagnetic supporting body [Pa · m] | light transmittance [%] | permeating water vapor amount [g/m² · day] | configuration of magnetic tape | magnetization deterioration rate [%] |
|---|---|---|---|---|---|---|---|
| Example 31 | 4100 | 4.8 | 19680 | 0.8 | 2.9 | ○ | 4.8 |
| Example 32 | 4820 | 4.8 | 23136 | 0.5 | 3.4 | ○ | 6.1 |
| Example 33 | 4940 | 4.8 | 23712 | 3.0 | 3.6 | ○ | 5.7 |
| Example 34 | 5170 | 4.8 | 24816 | 5.0 | 3.2 | ○ | 5.2 |
| Example 35 | 4610 | 4.8 | 22128 | 0.7 | 1.9 | ○ | 2.5 |
| Example 36 | 13870 | 2.5 | 34675 | 3.2 | 4.3 | ○ | 6.9 |
| Comparative Example 17 | 3080 | 4.8 | 14784 | 1.2 | 17.8 | ○ | 34.2 |
| Comparative Example 18 | 3050 | 6.4 | 19520 | 1.2 | 12.3 | ○ | 29.6 |
| Comparative Example 19 | 3130 | 4.8 | 15024 | 12.0 | 14.8 | ○ | 30.1 |

TABLE 7-continued

|  | Young's modulus of elasticity [MPa] | Nonmagnetic supporting body thickness [μm] | Young's modulus of elasticity × nonmagnetic supporting body [Pa·m] | light transmittance [%] | permeating water vapor amount [g/m²·day] | configuration of magnetic tape | magnetization deterioration rate [%] |
|---|---|---|---|---|---|---|---|
| Comparative Example 20 | 5990 | 4.8 | 28752 | 0.2 | 1.4 | x | 1.1 |
| Comparative Example 21 | 10800 | 4.4 | 47520 | 1.2 | 11.2 | ○ | 24.4 |
| Comparative Example 22 | 11040 | 2.5 | 27600 | 1.3 | 19.3 | ○ | 36.6 |
| Comparative Example 23 | 5210 | 4.8 | 22924 | 5.2 | 1.8 | x | 2.0 |

A product of Young's modulus of elasticity in the length direction of the magnetic tape and the thickness of the nonmagnetic supporting body, that is, (Young's modulus of elasticity x nonmagnetic supporting body thickness) [Pa·m] in Table 1 serves as a criterion of the mechanical strength of the magnetic tape and if this is secured to be about 18000 [Pa·m], it can be considered that a sufficient strength for actual use is possessed.

The light transmittance [%] in Table 7 was measured by inserting a sample magnetic tape of each of the examples 31–36 and the comparative example 17–23 in between a light emitting source and a detector in an apparatus for detecting light emitted from an infrared-emitting diode having the wavelength of 910 nm. Meanwhile, assuming that light transmittance in case where the nonmagnetic supporting body 1 not coated with film was measured was 100[%] as a criterion, measured data was converted to numerals under comparison with that criterion.

Meanwhile, in a recording/reproduction system for an ordinary magnetic tape, if light transmittance is larger than 5[%], an end sensor is activated. Thus, a portion contributing to signal recording in the magnetic tape, that is, light transmittance in a signal effective region needs to be less than 5[%] for actual use.

The permeating water vapor amount in Table 7 was measured with WATER VAPOR PERMEABILITY TESTER L80-4000 (permeating water vapor measuring instrument) made by Lyssy.

The permeating water vapor amount has a correlation with storage durability of the magnetic tape. That is, the smaller the permeating water vapor amount, the higher the corrosion resisting effect of the magnetic layer is, so that an excellent storage durability was secured.

In the evaluation about the configuration of the magnetic tape in Table 7, a case where the magnetic tape is deformed remarkably thereby inducing a trouble in tape traveling is marked with a cross and a case where there is no inconvenience in tape traveling for actual use is marked with a circle.

As for the magnetization deterioration rate in Table 7, the metallic thin film magnetic recording medium 100 of the present invention was stored for six days under a condition that the temperature was 65[° C.] and the relative humidity was 90[%] in order to recognize the effect of the lining layer and subjected to corrosion test. At this time, magnetization amount was measured preliminarily and then a magnetization deterioration rate was measured by comparing with the magnetization amount after storage. At this time, the magnetization deterioration rate was defined as (1− (magnetization amount after corrosion test)/(magnetization amount before corrosion test)×100[%].

The magnetization deterioration rate is 0[%] if the sample magnetic tape did not corrode at all and it is 100[%] if it corroded entirely. This is a numeral for evaluating the corrosion resistance of the magnetic tape.

Meanwhile, the magnetization amount was measured with a specimen vibration type magnetometer.

In the metallic thin film magnetic recording mediums of the examples 1–6, which, as shown in Table 7, comprises the magnetic layer having the thickness of 100 nm or less formed on a main face of the nonmagnetic supporting body according to the vacuum thin film formation technology and the lining layer having the thickness of 10–100 [nm] formed of metal, non-metal formed or alloy of these substances or oxide compound thereof according to the vacuum thin film formation technology, although the nonmagnetic supporting body 1 is of a very thin film, the mechanical strength of the medium can be improved because of the formation of the lining layer 3. Consequently, Young's modules of elasticity of the magnetic tape is 18,000 [Pa·m] or more, indicating that a sufficient mechanical strength for actual use is possessed.

Because in the metallic thin film magnetic recording mediums of the example 31–36, the light transmittance in the signal effective region was set less than 5[%], erroneous activation of the end sensor function of the magnetic tape reproduction system during traveling of the tape was avoided, so that sufficient functional performance could be exerted.

Further, because in the metallic thin film magnetic recording mediums of the examples 31–36, the permeating water vapor amount was kept 5 g/m²·day or less, corrosion of the magnetic layer was suppressed and the magnetization deterioration rate was less than 7%, so that a metallic thin film magnetic recording medium having an excellent corrosion resistance was obtained.

In the magnetic tape of the comparative example 17, its lining layer 3 was formed as a back coating layer by coating with coating medium containing carbon and urethane resin in the thickness of 0.5 μm after drying and drying it. In this example, the permeating water vapor amount was large, so that corrosion occurred in the magnetized layer thereby the magnetization deterioration rate being increased. Consequently, no sufficient corrosion resistance for actual use could be obtained. Further, because the nonmagnetic supporting body 1 was of thin type and further intensification of the mechanical strength was not achieved by the back coating layer, the mechanical strength was low.

In the magnetic tape of the comparative example 18, the lining layer was formed as a back coating layer by coating with coating medium containing carbon and urethane in the thickness of 0.5 μm after drying and drying it. In this example also, the permeating water vapor amount was large, so that corrosion occurred in the magnetic layer, thereby the magnetization deterioration rate being increased. Consequently, no sufficient corrosion resistance for actual use could be obtained.

In the magnetic tape of the comparative example 19, the lining layer 3 was formed in the thickness of 5 nm by vapor deposition using the evaporating apparatus 10 shown in FIG. 3 with Al as a target. Because in this example, the lining layer 3 was extremely thin, no sufficient mechanical strength could be secured, so that light transmittance increased to 12.0%, thereby inducing activation of the end sensor in the signal effective region. Further, the permeating water vapor amount was excessive, so that corrosion occurred in the magnetic layer thereby the magnetization deterioration rate being increased. Consequently, no corrosion resistance for actual use could be secured.

In the magnetic tape of the comparative example 20, the lining layer 3 was formed in the thickness of 150 nm by vapor deposition with Al as a target. Because in this example, the thickness of the lining layer 3 was larger than that of the magnetic layer, curl and cupping characteristic of the magnetic tape deteriorated, so that the configuration of the tape worsened.

In the magnetic tape of the comparative example 21, polyamide film 4.4 μm in thickness was used as the nonmagnetic supporting body 1. The lining layer 3 was formed as a back coating layer by coating with coating medium containing carbon and urethane resin in the thickness of 0.5 μm after drying and drying it. Because in this example, the mechanical strength of the nonmagnetic supporting body was high, the value of (Young's modules of elasticity× nonmagnetic supporting body thickness) was excellent, so that a sufficient mechanical strength for the magnetic recording medium was obtained. However, the permeating water vapor amount was large, so that corrosion occurred in the magnetic layer thereby the magnetization deterioration rate being increased. Consequently, no sufficient corrosion resistance for actual use was secured.

In the magnetic tape of the comparative example 22, polyamide film 2.5 μm in thickness was used as the nonmagnetic supporting body 1. The lining layer 3 was formed as a back coating layer by coating with coating medium containing carbon and urethane resin in the thickness of 0.5 μm after drying and drying it. Because in this example, the mechanical strength of the nonmagnetic supporting body was high, the value of (Young's modules of elasticity× thickness of nonmagnetic supporting body) was excellent, so that a sufficient mechanical strength for the magnetic recording medium was secured. However, the permeating water vapor amount was large, so that corrosion occurred in the magnetic layer thereby the magnetization deterioration rate being increased. Consequently, no sufficient corrosion resistance for actual use was secured.

In the magnetic tape of the comparative example 23, its lining layer 3 was formed in the thickness of 105 nm by vapor deposition by introducing oxygen by $1.4 \times 10^{-3}$ [$m^3$/minute] with Co as a target in the evaporating apparatus 10 shown in FIG. 3.

In this example, because the thickness of the lining layer 3 was larger than that of the magnetic layer, roll and cupping characteristic of the magnetic tape deteriorated, thereby the configuration of the magnetic tape worsening.

As evident from the above description, the metallic thin film magnetic recording medium 100 of the present invention is preferable for a high sensitivity MR head because its magnetic layer was formed as a thin layer in the thickness of 100 nm or less. Further, because the lining layer was formed on a main face opposite to the magnetic layer according to the thin film formation technology, the mechanical strength could be maintained even when thin nonmagnetic supporting body was produced of cheap material. As a result, reduction in production cost of the metallic thin film magnetic recording medium was achieved.

Further, by specifying the light transmittance in the signal effective region 5% or less in the metallic thin film magnetic recording medium 100 of the present invention, erroneous activation of the end sensor of a reproduction apparatus could be avoided.

Further, because the lining layer was formed on a main face opposite to the magnetic layer according to the thin film formation technology, the magnetic layer was protected from a bad influence from external environment. Particularly by reducing the permeating water vapor amount to 5 $g/m^2 \cdot day$, corrosion of the magnetic layer was avoided effectively, so that the corrosion resistance was improved, thereby the magnetization deterioration rate being reduced.

Because in the metallic thin film magnetic recording medium of the present invention, its magnetic layer 2 was formed in the thickness of 20–100 nm, a sufficient reproduction output was secured and low noise was achieved when it was applied to a high sensitivity MR head. Consequently, an excellent S/N ratio was obtained.

Further, because the lining layer 3 was formed on a main face opposite to the magnetic layer 2 according to the thin film formation technology, even if the nonmagnetic supporting body 1 having a thickness as small as 5 μm or less of cheap material was employed, the stiffness of the magnetic tape, that is, the mechanical strength could be raised to a practically sufficient level. Consequently, the recording density per unit weight could be improved and further, production cost was reduced.

Further, because the lining layer 3 was formed on a main face opposite to the magnetic layer 2 according to the thin film formation technology, generation of the cupping in the magnetic tape could be reduced, thereby the traveling stability of the tape being improved.

Further, because the lining layer 3 was formed on a main face opposite to the magnetic layer according to the thin film formation technology, corrosion of magnetic component of the magnetic layer 2 was avoided and the corrosion resistance was improved, so that the magnetization deterioration rate was reduced.

The metallic thin film magnetic recording medium of the present invention is suitable for a high sensitivity MR head. In this recording medium, thinning of the magnetic layer and nonmagnetic supporting body was achieved so as to improve the recording density per unit volume.

Because the lining layer is formed of predetermined material on a main face opposite to the magnetic layer according to vacuum thin film formation technology, even if the nonmagnetic supporting body is formed thinly of the conventional cheap material, sufficient mechanical strength can be maintained without employing the nonmagnetic supporting body of expensive material, thereby leading to reduction of the production cost.

Further, because sufficient stiffness is secured, the durability, traveling stability and contact performance with the magnetic head are improved.

Further, because the thickness of the lining layer 3 and the thickness of the back layer 5 are specified numerically, the relative roughness factor (Ra) of the topmost surface is controlled, so that the configuration of the magnetic tape is optimized.

Because the lining layer 3 is formed of predetermined material on a main face opposite to the magnetic layer 2 according to vacuum thin film formation technology, a bad influence from external environment is avoided, so that corrosion resistance and storage characteristic are improved.

Further, because the lining layer 3 is formed, the back layer can be applied on the lining layer according to vacuum vapor deposition method such as CVD method and sputtering method or coating method and further, the relative roughness factor of the surface can be controlled. By specifying the roughness factor (Ra) to 2–15 nm, the frictional coefficient of the surface is controlled so as to improve the traveling stability.

The metallic thin film magnetic recording medium of the present invention can be adapted to a high sensitivity MR head because the magnetic layer is formed in the thickness of 100 nm or less. Further, because the lining layer is formed on a main face opposite to the magnetic layer according to the thin film formation technology, sufficient mechanical strength can be maintained despite such a thin nonmagnetic supporting body, so that reduction in production cost of the metallic thin film magnetic recording medium is achieved.

Further, because in the metallic thin film magnetic recording medium of the present invention, light transmittance in a signal effective region is specified 5% or less, erroneous operation of an end sensor, which is a reproduction device, can be avoided.

Further, because the lining layer is formed on a main face opposite to the magnetic layer, the magnetic layer is protected from a bad influence from external environment and particularly, by specifying permeating water vapor amount to be 5 $g/m^2 \cdot day$, corrosion of the magnetic layer is avoided effectively and corrosion resistance is improved, thereby reduction of magnetization deterioration rate being achieved.

Having described preferred embodiments of the invention with reference to the accompanying drawings, it is to be understood that the invention is not limited to those precise embodiments and that various changes and modifications could be effected therein by one skilled in the art without departing from the spirit or scope of the invention as defined in the appended claims.

What is claimed is:

1. A metallic thin film magnetic recording medium comprising:
    a magnetic layer formed on one face of a nonmagnetic supporting body according to vacuum thin film formation technology, and
    a carbon protective layer formed on said magnetic layer to a thickness of 4 nm to 15 nm;
    wherein a thickness of said nonmagnetic supporting body is 5 nm or less, and wherein a thickness of said magnetic layer is 20 nm–100 nm, said metallic thin film magnetic recording medium further comprising:
        a lining layer having a thickness of 20 nm–200 nm formed on a another face opposite to said magnetic layer formation face, of one of metal, non-metal, alloy and oxide compound thereof according to vacuum thin film formation technology; and
        a back layer formed on said lining layer, said back layer being formed in a thickness of 10–200 nm and with a relative roughness factor (Ra) of an exposed surface of said back layer being 2–15 nm.

2. The metallic thin film magnetic recording medium according to claim 1, wherein said lining layer is formed of one of any metal of Mg, Al, Si, Ti, V, Cr, Fe, Co, Ni, Cu, Zn, Ge, Zr, Nb, Mo, W, alloy of said metals and oxide compound of said metals.

3. The metallic thin film magnetic recording medium according to claim 1,
    wherein said nonmagnetic supporting body is elongated-shaped, and said magnetic layer is formed on said face of said elongated-shaped nonmagnetic supporting body according to said vacuum thin film formation technology, and
    wherein when cupping in a width direction is a and the width is w, $a/w \leq 10.0$ is satisfied.

4. The metallic thin film magnetic recording medium according to claim 1, wherein recording and reproduction of information are executed with a magneto-resistance effect (MR) head.

5. A metallic thin film magnetic recording medium comprising:
    a magnetic layer formed on one face of a nonmagnetic supporting body according to vacuum thin film formation technology;
    wherein a thickness of said nonmagnetic supporting body is 5 $\mu$m or less, and
    wherein a thickness of said magnetic layer is 20 nm–100 nm, said metallic thin film magnetic recording medium further comprising:
        a lining layer having a thickness of 20 nm–200 nm formed on another face opposite to said magnetic layer formation face, of one of metal, non-metal, alloy and oxide compound thereof according to vacuum thin film formation technology;
    wherein said magnetic layer is formed on said nonmagnetic supporting body via a Cr foundation layer formed by a sputtering method, said magnetic layer being formed of any one of CoCrTa, CoCrPt, CoCrPtTa, $CoPtSiO_2$, and CoPtB-O.

6. A metallic thin film magnetic recording medium comprising:
    a magnetic layer formed on one face of a nonmagnetic supporting body according to vacuum thin film formation technology,
    wherein a thickness of said nonmagnetic supporting body is 5 $\mu$m or less, and
    wherein a thickness of said magnetic layer is 20 nm–100 nm, said metallic thin film magnetic recording medium further comprising:
        a lining layer having a thickness of 20 nm–200 nm formed on a another face opposite to said magnetic layer formation face, of one of metal, non-metal, alloy and oxide compound thereof according to vacuum thin film formation technology; and
        a back layer formed on said lining layer, said back layer being formed in a thickness of 10–200 nm and with a relative roughness factor (Ra) of an exposed surface of said back layer being 2–15 nm;
    wherein said magnetic layer is formed on said nonmagnetic supporting body not via the foundation layer.

7. The metallic thin film magnetic recording medium according to claim 6, wherein said magnetic layer is formed of at least one of Go, CoNi, oxide thereof, CoCrTa, CoCrPt, CoCrPtTa, $CoPtSiO_2$, and CoPtB-O.

8. A metallic thin film magnetic recording medium, comprising:
  a lining layer formed on a first face of a nonmagnetic supporting body opposite to a second face on which a magnetic layer is formed, and
  wherein said lining layer is formed of any one of metal, non-metal, alloy of these materials and oxide compound thereof, according to vacuum thin film formation technology, and light transmittance in a signal effective region is 5% or less and permeating water vapor amount is 5 $g/m^2$ day or less.

9. The metallic thin film magnetic recording medium according to claim 8, wherein a carbon protective film is formed on said lining layer.

10. The metallic thin film magnetic recording medium according to claim 8, wherein a lubricant layer is formed on said lining layer.

11. The metallic thin film magnetic recording medium according to claim 9, wherein a lubricant layer is formed on said carbon protective film.

* * * * *